United States Patent
Erickson et al.

(10) Patent No.: US 10,983,889 B2
(45) Date of Patent: Apr. 20, 2021

(54) STREAM-BASED COMPOSITION AND MONITORING SERVER SYSTEM AND METHOD

(71) Applicant: AVEVA Software, LLC, Lake Forest, CA (US)

(72) Inventors: Brian Kenneth Erickson, Long Beach, CA (US); Greg C. Clinton, Mission Viejo, CA (US); Vinay T. Kamath, Rancho Santa Margarita, CA (US); Abhijit Manushree, Laguna Niguel, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 0 days.

(21) Appl. No.: 16/560,824

(22) Filed: Sep. 4, 2019

(65) Prior Publication Data
US 2020/0104225 A1    Apr. 2, 2020

Related U.S. Application Data

(60) Provisional application No. 62/726,805, filed on Sep. 4, 2018.

(51) Int. Cl.
*G06F 15/173* (2006.01)
*G06F 11/30* (2006.01)
(Continued)

(52) U.S. Cl.
CPC ........ *G06F 11/3006* (2013.01); *G06F 9/3836* (2013.01); *G06F 9/451* (2018.02);
(Continued)

(58) Field of Classification Search
None
See application file for complete search history.

(56) References Cited

U.S. PATENT DOCUMENTS

| 6,199,082 B1 * | 3/2001 | Ferrel | G06F 16/958 |
| | | | 715/205 |
| 6,523,035 B1 | 2/2003 | Fleming et al. | |

(Continued)

OTHER PUBLICATIONS

International Search Report and Written Opinion for International Application No. PCT/US2019/049584, dated Dec. 27, 2019, 10 pages.

*Primary Examiner* — Phuoc H Nguyen
(74) *Attorney, Agent, or Firm* — Greenberg Traurig, LLP

(57) ABSTRACT

Embodiments of the invention provide a management console enabling monitoring of distributed components of a process control application. The management console includes a management console window that can be customized according to one or more user-defined software code modules that interface to data sources to populate views supported by the console window. The invention further includes a language and method of composing blocks of executable code within the management console that provide the capability to run many analyses simultaneously. The console window includes a set of view templates including controls for manipulating graphically displayed representations of data rendered by the distributed components, and an interface for exchanging requests and data with an extensible set of software modules that provide data links to one or more distributed data-linked components. The set of software modules also define the customizable portions of the view rendered by the console window.

20 Claims, 11 Drawing Sheets

(51) Int. Cl.
*G06F 9/38* (2018.01)
*G06F 9/451* (2018.01)
*G06F 9/48* (2006.01)
*G06F 11/32* (2006.01)

(52) U.S. Cl.
CPC .......... *G06F 9/4881* (2013.01); *G06F 11/302* (2013.01); *G06F 11/321* (2013.01)

(56) References Cited

U.S. PATENT DOCUMENTS

| | | |
|---|---|---|
| 6,567,808 B1 | 5/2003 | Eschelbeck et al. |
| 2004/0153804 A1* | 8/2004 | Blevins .............. G05B 19/0428 714/33 |
| 2008/0201454 A1 | 8/2008 | Soffer |
| 2011/0172965 A1* | 7/2011 | McIntyre ........... G05B 23/0216 702/183 |
| 2015/0120636 A1 | 4/2015 | Gao |
| 2017/0106197 A1* | 4/2017 | Wechter ................ G16H 40/63 |

* cited by examiner

```
POST          https://localhost/alnews

Authorization    Headers (2)    Body    Pre-request Script    Tests

○ form-data   ○ x-www-form-urlencoded   ● raw   ○ binary   ○ JSON (applic

1  {
2    "fqns":["sys.0DataRetrieval_IN_0.CPU_Usage"],
3    "primaryFqn":"sys.0DataRetrieval_IN_0.CPU_Usage",
4    "score": 1,
5    "algorithm": "Comment",
6    "author": "MH",
7    "reportedDatetime": "2017-10-24T15:26:00Z",
8    "data":[{
9        "value":5,
10       "timestamp":"2017-10-24T15:26:00Z",
11       "state":"good"
12   }],
13   "source": "DevICTesting",
14   "state":"high",
15   "chartType":"line",
16   "units":["ms"],
17   "timezone": "-07:00",
18   "news_starttime": "2017-10-24T10:26:00Z",
19   "news_endtime": "2017-10-24T15:26:00Z",
20   "tz":"Los Angeles",
21   "drill_starttime":"2017-10-24T10:26:00Z",
22   "drill_endtime":"2017-10-24T15:26:00Z",
23   "drill_fqn":["sys.0DataRetrieval_IN_0.CPU_Usage"],
24   "user_comment":"hey"
25  }
26
```

FIG. 11

STREAM-BASED COMPOSITION AND MONITORING SERVER SYSTEM AND METHOD

CROSS-REFERENCE TO RELATED APPLICATIONS

This application claims the benefit of and priority to U.S. Provisional Patent Application No. 62/726,805, filed Sep. 4, 2018, entitled, "STREAM-BASED COMPOSITION AND MONITORING SYSTEM AND METHOD", the entire contents of which are incorporated herein by reference.

BACKGROUND

The ability to assemble or structure blocks of data processing algorithms to monitor and run many analyses simultaneously is a challenge for many conventional computer systems and processes. It would be advantageous to be able to use systems that include a scalable, streamed, forked, composition block based approach to effectively run multiple analyses and big data computations and experiments in parallel on a continuous basis.

SUMMARY

Some embodiments of the invention include a server system comprising at least one processor configured to be coupled to a non-transitory computer-readable storage medium storing thereon a program logic for execution by the at least one processor. In some embodiments, the program logic comprises at least one logic module executable by the at least one processor for managing an exchange of at least one data stream between at least one management console and at least one distributed component of a distributed environment. In some embodiments, the at least one management console comprises a customizable interface for integrating an extensible set of software modules providing data links to one or more of the distributed components. In some embodiments, the software modules comprise one or more user-definable composition blocks configured to submit requests or control one or more of the distributed components. In some embodiments, the one or more user-definable composition blocks that are submitted into the management console can enable operational access to exposed attributes corresponding to an operational status of at least one of the distributed components. Some further embodiments include at least one further module executable by the at least one processor for displaying one or more data view windows, where at least one of the data view windows includes data and/or controls for manipulating graphically displayed representations of data extracted from the at least one data stream.

In some embodiments, the one or more distributed components include one or more distributed components of a process control and/or manufacturing information system. In some embodiments, the at least one data stream comprises diagnostic data, operation or control code of one or more coupled servers and/or application engines, operational status of at least one database, and/or an operational status of at least one coupled distributed component.

In some embodiments, the software modules are configured to provide users with bi-directional access to logic objects configurable for issuing commands to application objects within the distributed environment. In some further embodiments, the one or more data view windows include at least one work area populated by attributes or data obtained from execution of at least one of the user-definable composition blocks.

In some embodiments, the set of software modules comprise one or more snaplet modules that provide data and/or interface control definitions. In some embodiments, the one or more user-definable composition blocks comprise a scalable code architecture. In some further embodiments, the one or more user-definable composition blocks comprise a forked-code architecture.

In some embodiments, the one or more user-definable composition blocks comprise a code architecture with a capability to at least one of run a plurality of analyses simultaneously, run against real data, run against streaming incoming data, provide fork variations of an analysis, and create derived streams of data.

In some embodiments, the user-definable composition blocks comprise a snap language defining executable code configurable by a user to add one or more data processing units dynamically. In some embodiments, the one or more data processing units are configured to be identified and executed by at least one worker process of the distributed environment. In some embodiments, the at least one worker process comprises a scheduler configured to select at least one of the data processing units for processing at a specific time or schedule.

In some embodiments of the invention, the one or more data processing units can be added on the fly for selection and processing by the at least one worker process. Some embodiments further comprise an application program interface configured to generate a comments display associated with at least one of the data view windows. In other embodiments, the one or more data processing units are configured to create a model for multi-tag-anomaly analysis.

Some embodiments include a server system comprising at least one processor configured to be coupled to a non-transitory computer-readable storage medium storing thereon a program logic for execution by the at least one processor. In some embodiments, the at least one user-definable composition block comprises a snap language defining executable code configurable by a user, where at least a portion of the executable code is configured to create and launch one or more data processing units dynamically within a distributed environment.

Some embodiments include at least one logic module executable by the at least one processor for managing display and control of a management console. In some embodiments, the management console is configured to accept the at least one user-definable composition block, and further configured to manage the exchange of at least one data stream between the at least one management console and at least one distributed component of the distributed environment. In some further embodiments, the one or more data processing units are configured to be identified and executed by at least one worker process running on at least one processor of the distributed environment. In other embodiments, the at least one management console comprises a customizable interface configured and arranged for integrating an extensible set of software modules providing data links to one or more of the distributed components of the distributed environment.

In some embodiments, the software modules comprise one or more user-definable composition blocks configured to submit requests or control one or more of the distributed components, and/or enable operational access to exposed attributes corresponding to an operational status of at least one of the distributed components.

Some embodiments further comprise at least one module executable by the at least one processor for displaying one or more data view windows, where the data view windows include data and/or controls for manipulating graphically displayed representations of data extracted from the at least one data stream. Some embodiments further comprise an application program interface configured to generate a comments display associated with at least one of the data view windows.

DESCRIPTION OF THE DRAWINGS

FIG. 11 depicts how to invoke a "POST method of News" process in accordance with some embodiments of the invention.

DETAILED DESCRIPTION

Figure 1:
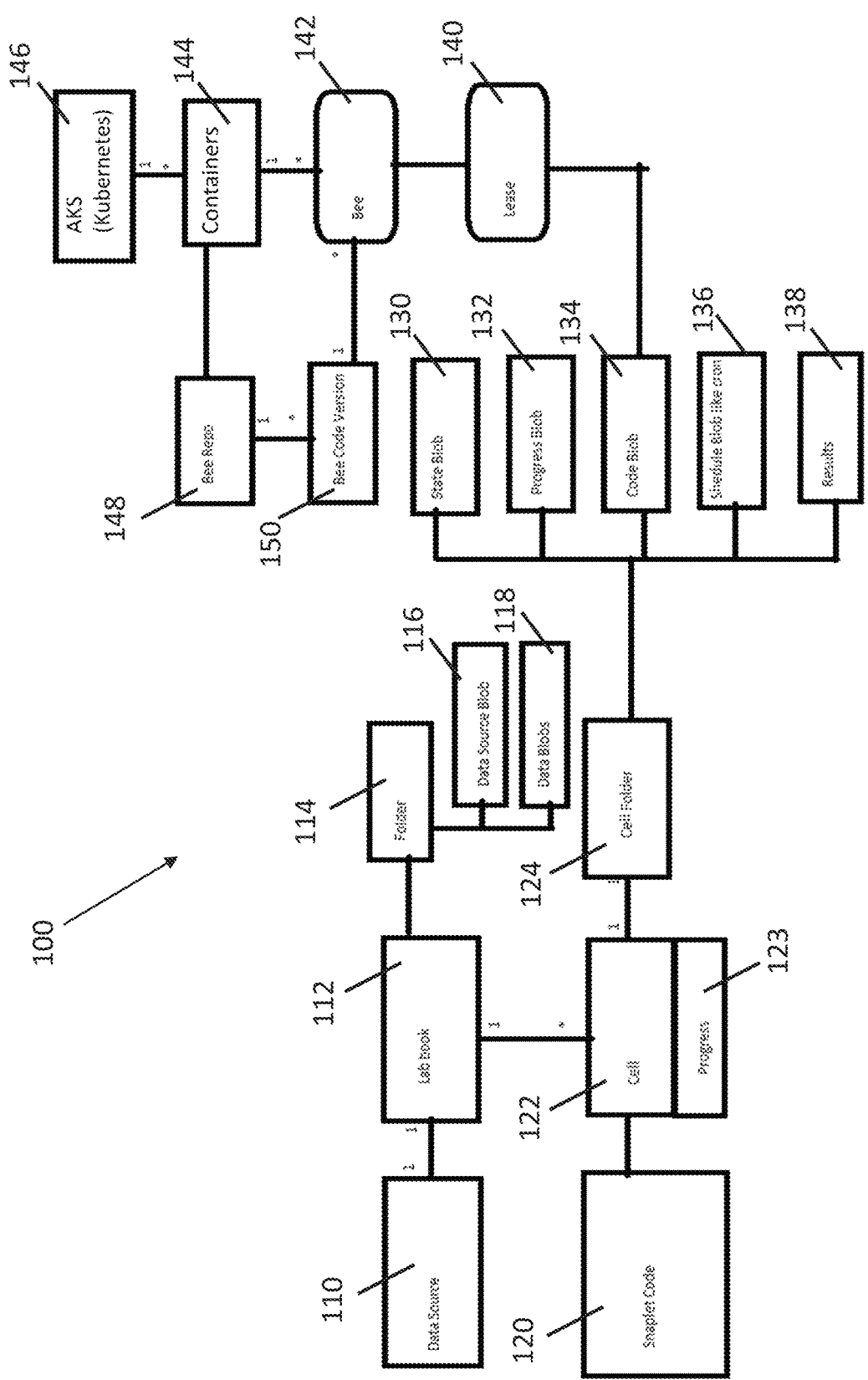
FIG. 1 shows a folder structure schema for lab book for bee processing according to some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of the invention herein generally describe non-conventional approaches to systems and methods to data processing and management that are not well-known, and further, are not taught or suggested by any known conventional methods or systems. Moreover, the specific functional features are a significant technological improvement over conventional methods and systems, including at least the operation and functioning of a computing system that are technological improvements. These technological improvements include one or more aspects of the systems and methods described herein that describe the specifics of how a machine operates, which the Federal Circuit makes clear is the essence of statutory subject matter.

One or more of the embodiments described herein include functional limitations that cooperate in an ordered combination to transform the operation of a data repository in a way that improves the problem of data storage and updating of databases that previously existed. In particular, some embodiments described herein include system and methods for managing single or multiple content data items across disparate sources or applications that create a problem for users of such systems and services, and where maintaining reliable control over distributed information is difficult or impossible.

The description herein further describes some embodiments that provide novel features that improve the performance of communication and software, systems and servers by providing automated functionality that effectively and more efficiently manages resources and asset data for a user in a way that cannot effectively be done manually. Therefore, the person of ordinary skill can easily recognize that these functions provide the automated functionality, as described herein, in a manner that is not well-known, and certainly not conventional. As such, the embodiments of the invention described herein are not directed to an abstract idea and further provide significantly more tangible innovation. Moreover, the functionalities described herein were not imaginable in previously-existing computing systems, and did not exist until some embodiments of the invention solved the technical problem described earlier.

Some embodiments include a management console that can facilitate monitoring of distributed components of a process control application. In some embodiments, the management console can operate as an effective administrative tool for performing many high-level system control operations and/or can enable users to manage one or more control functions of the system and/or create new control, monitoring, and diagnostic functions. In some embodiments, the system can provide tools for data access via software modules using a graphical user interface (hereinafter "GUI"). In some embodiments, the GUI-based management console can host an extensible set of snaplet software modules relating to various control, diagnostic monitoring, and management functions and operations.

In some embodiments, the management console can function as a primary interface for controlling an operational process control and manufacturing information application, and further as the source of displayed high and low-level diagnostics and/or control functions for components of an industrial process. In some embodiments, the management console can provide a GUI comprising a variety of views depicting an assortment of diagnostic data and commands where users can assert one or more linked objects or code modules.

In some embodiments, the functionality of the management console can be bi-directional in the sense that it can gather data and status of objects or code modules, and issue commands changing data or status of the linked objects or code modules throughout a distributed environment comprising distributed components. Thus, in some embodiments, in addition to displaying retrieved diagnostic information, the management console can enable a user to select a graphically depicted representation of an object on one or more supported views and then specify a command or action to be performed upon the selected displayed object. For example, in some embodiments, the management console can include a management console window that can be customized according to one or more user-defined software code modules that interface to data sources to populate views supported by the management console window. In some embodiments, the management console window includes a set of view templates including controls for manipulating graphically displayed representations of data rendered by the distributed components. In some embodiments, the management console window also includes an interface for exchanging requests and data with an extensible set of software modules that provide data links to one or more distributed data-linked components. In some embodiments, the software modules also define the customizable portions of the view rendered by the management console window.

Some embodiments of the invention include a system comprising a language and method of composing blocks of executable code within the management console that provide the capability to run many analyses simultaneously. Some further embodiments of the invention include a system of composing blocks of executable code that run against real data. Some other embodiments of the invention include a language and method of composing blocks of executable code that run against streaming incoming data.

Some embodiments include a system of composing blocks of executable code that provide fork variations of an analysis. Some further embodiments include a system composing blocks of executable code that can provide or create derived streams of data. Some other embodiments include a language and method of composing blocks of executable code that run from saved intermediate results.

Some embodiments of the invention include a system for composing blocks of executable code that publish and consume data streams. Some embodiments of the invention include a language and method of composing blocks of executable code that can run unattended as a system or in user mode (browser closed and return later for reviewing bounded and unbounded analysis). Some further embodiments of the invention include a snap language defined to form composition blocks. For example, some embodiments of the invention include a language and method of composing blocks of executable code that add new data processing units ("snaplets") dynamically. In some embodiments, the snaplets can provide a management control over one or more portions of a process control and manufacturing information system comprising an operational historian through the use of a GUI-based management console and an extensible set of snap-on or snaplet software modules that can be used for control and/or diagnostic purposes, including, but not limited to information from remotely located sources of process control data. Accordingly, in some embodiments, the system can enable one or more users to manage distributed diagnostic and process control data data-streams of an industrial system by calling up a single module, herein defined and described as a management console. The snaplets will be described in more detail below.

Some embodiments of the invention include a scripting language including, but not limited to, two keywords "snap" and "onto". In some embodiments, "snap" can couple processing units/or "snaplets" as described. As defined herein, a snaplet can be a discrete piece of processing block which is extensible. Some further embodiments include a "Bee" that is a worker process running on a distributed environment looking to execute one or more snaplets. Some embodiments include scheduler "bees" that process snaplets. In some embodiments, snaplets can be added on the fly to get picked by the bees for processing. Some embodiments include multiple bees on a machine and multiple machines that form a scalable swarm. In some embodiments, the system manages the execution of bees and ensures isolation of snaplet execution.

Referring to FIG. 1, a folder structure of some embodiments of the system is shown, including the data source 110 that is communicatively coupled to lab book 112 that is communicatively coupled to at least one folder 114, which is also communicatively coupled to data source blob 116 and data blobs 118. In some embodiments, snaplet code 120 is communicatively coupled to cell 122 which is communicatively coupled to progress 123. In some embodiments, cell folder 124 is communicatively coupled to state blob. In some embodiments, cell folder 124 is communicatively coupled to progress blob 132. In some embodiments, cell folder 124 is communicatively coupled to code blob 134. In some embodiments, cell folder 124 is communicatively coupled to schedule blob like cron 136. In some embodiments, cell folder 124 is communicatively coupled to results 138. In some embodiments, code blob 134 is communicatively coupled to lease 140 that is communicatively coupled to bee 142, that is communicatively coupled to bee code version 150 which is communicatively coupled to/from bee repo 148 that is communicatively coupled to machine 144 that is communicatively coupled to scaleset 146.

Some embodiments described include executable code that is extensible to provide new snaplets as required including snaplets that connect to other snaplets. In some embodiments, snaplets created or processed using a "Run/OnData" command can invoke children with the results of processing. Some further embodiments include root snaplets that support run functions in the system.

Some embodiments include asynchronous processing and display of user mode algorithms. Some further embodiments include a process for forcing the inputs and outputs match for snaplets. Some other embodiments include auto-completion of compatible snaps to onto keyword. Some embodiments include auto-completion of snaplet specific language. In some embodiments, snap or snap language code connects the snaplets to perform an execution block. In some embodiments, each snaplet can define its own mini language that is parsed to perform tasks specific to that snaplet.

In accordance with some embodiments, some non-limiting example snaplets and child snaplets including some description and/or capability or function are shown in Tables 1 and 2.

TABLE 1

Non-limiting examples of snaplets

| Snaplet | Comment |
| --- | --- |
| bee | Reports machine and process information for the currently running bee. |
| blob | When run, snap blob reads the contents of a storage blob. |
| boot | Creates system lab books for data sources as they are added to storage. |
| consoles | Allows user to list and remove snaplet diagnostic console messages. |
| correlated | Finds correlated groups of tags for use in detection of systems. |
| decode | Decodes L0 blobs and writes results to L1 storage for a data source. |
| every | Schedules lab book cells to run every X number of minutes, hours or days. |
| hcal | Reads L0 time series data blobs for a data source. |
| reporters | Invokes the python code that monitor L2 and posts news stories for any anomalies found for a data source. Also builds model files for algorithms. |
| slicer | Merges L2 data into deltas storage. |
| sources | Lists data sources found in storage. |
| stream | When run, snap stream reads data from a stream. |
| tags | Lists tags for a given data source. |
| use | Specifies the default data source for a lab book. |
| zipper | Merges L1 blobs into an L2 blob for a data source. |

TABLE 2

Non-limiting examples of child snaplets

| Snaplet | Comment |
| --- | --- |
| filter | Explicitly includes or excludes rows of data based on field values. |
| minutes | Generates a time sequence for synthesized time series. Used with a random snaplet. |
| show | Formats output for consumption in lab book presentation. |
| span | Specifies a time span such as "since apr" or "from mon to today". |
| fork | Allows adding multiple children to a snaplet. |
| mta.train | Creates a model for multi-tag anomaly analysis. |
| mta.monitor | Monitors incoming data with mta.train model and outputs discrepancies. |
| mta.report | Prepares news story for mta anomalies and sends to news. |
| news | Posts news stories to cosmos database. |
| random | Generates random data for synthesized time series. Used with minutes snaplet. |
| blob | On data, onto blob writes to a blob. |
| deltas | Reads tag time series data from deltas storage. |
| golden | Finds statistically deviant time series values. |
| sort | Sorts data based on field name. |
| stream | On data, onto stream appends data to a stream. |

Some embodiments include a "lab book" that can be a presentation layer for user mode processing. In some embodiments, the lab book can be a collection of cells that are used in system/user mode to perform the snap blocks.

Some embodiments comprise, utilize, couple-to, and/or process a "notebook". Table 3 below comprises a storage format of the notebook in accordance with some embodiments.

TABLE 3 comprises a storage format of the notebook

| | |
| --- | --- |
| UUUUUUUU | user id (unique among all users) |
| NNNNNNNN | notebook id (unique for a user) |
| CCC | cell id (unique for a notebook) |
| 1 | result id (unique for a cell) |
| notebook/users | block blob with UUUUUUUU, email rows |
| notebook/UUUUUUUU/ | user prefix |
| notebook/UUUUUUUU/NNNNNNNN/ | notebook prefix |
| notebook/UUUUUUUU/NNNNNNNN/CCC/ | cell prefix |
| notebook/UUUUUUUU/notebooks | block blob with NNNNNNNN, name rows |
| notebook/UUUUUUUU/NNNNNNNN/notebook | block blob with json for notebook |
| notebook/UUUUUUUU/NNNNNNNN/source | block blob with data source guid (optional) |
| notebook/UUUUUUUU/NNNNNNNN/CCC/code | block blob with code |
| notebook/UUUUUUUU/NNNNNNNN/CCC/progress | block blob with 96% canceled |
| notebook/UUUUUUUU/NNNNNNNN/CCC/schedule | block blob with every 10 days |
| notebook/UUUUUUUU/NNNNNNNN/CCC/0 | append blob first result |
| notebook/UUUUUUUU/NNNNNNNN/CCC/1 | append blob second result |
| notebook/UUUUUUUU/NNNNNNNN/blobs/ | folder for notebook blobs |
| notebook/UUUUUUUU/NNNNNNNN/streams/ | folder for notebook streams |

Some embodiments of the invention comprise a stream control. A non-limiting embodiment of a layout showing how the notebook structure is managed is shown below:

notebook/streams/my.stream/10000001
notebook/streams/my.stream/head_in
notebook/CCC/streams/my.stream/head_out Some embodiments include a "Representational State Transfer" application program interface ("API") "RESTAPI" for communicating with the notebook (Table 4).

TABLE 4

| | |
| --- | --- |
| notebook/notebooks | get list of my notebooks id, name |
| notebook/NNNNNNNN | get json for notebook |
| notebook/NNNNNNNN/CCC/run | run cell (posts code) |
| notebook/NNNNNNNN/CCC/progress | get running cell's progress |
| notebook/NNNNNNNN/CCC/cancel | cancel running cell |
| notebook/NNNNNNNN/CCC/1/132 | get second result starting at offset 132 |

The following describes some non-limiting examples of snaplets in action. In reference to snaplets of Table 5, in some embodiments, using the fork snaplet, multiple snaplets can be added as children to a parent snaplet to allow for multiple alternative paths of execution. In the snippet below, the "XTCA", "XTLF", and "ENTA" snaplets are added as children to the 12 parent snaplet. Each of the children snaplets look for their respective anomalies and send any anomalies found to news.

TABLE 5

```
snap l2 source sys
onto fork named sta
snap fork named sta
    onto xtca
    onto news
snap fork named sta
    onto xtlf
```

TABLE 5-continued

```
            onto news
        snap fork named sta
            onto enta
            onto news
```

Table 6 below shows a snap block providing an example of embodiments of how the correlation of tags (system detection) is performed on the data source "sys" for 3 two-day samples starting from "2018-01-10" and writing the output to the blob "sys.1".

TABLE 6

```
snap correlated source sys days 2 samples 3 threshold 95 start-day
    2018-01-10
    onto blob named sys.1
```

Referring to the snap block of Table 7, in some embodiments, systems stored in sys.1 blob are used below along with hcal data to train an mta model. In some embodiments, the model is then stored in mta.1 blob and displayed in the browser using the show snaplet.

TABLE 7

```
        snap hcal source sys from jan to feb
            onto mta_train systems sys.1
        onto blob named mta.1 scope datasource
            onto show
```

Figure 2:
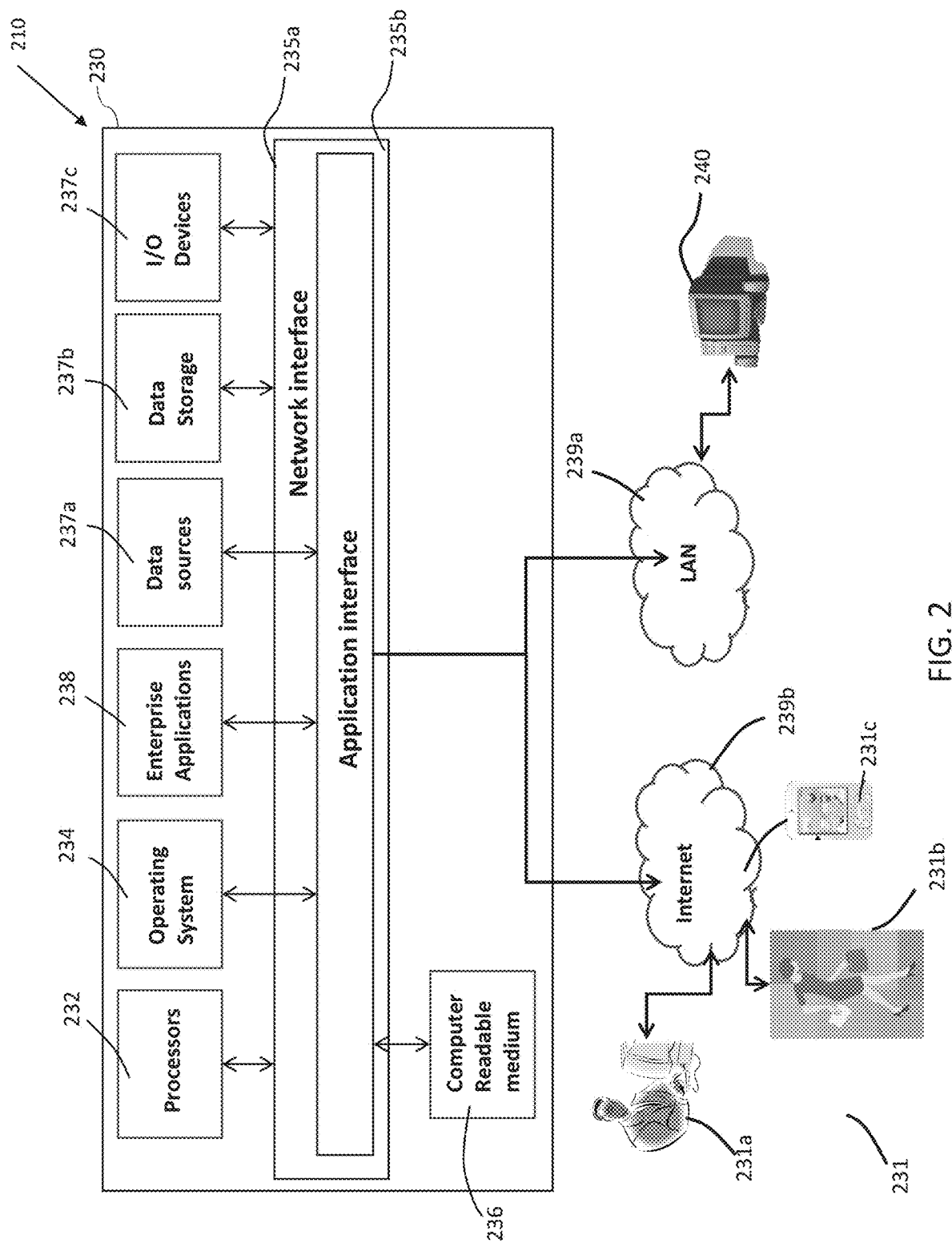
FIG. 2 is a non-limiting embodiment of a computer system capable of processing executable code of any of the embodiments of the invention and/or at least partially enabling operation of some embodiments of the invention.

FIG. 2 is a non-limiting embodiment of a computer system capable of processing executable code of any of the embodiments of the invention and/or at least partially enabling operation of at least a portion of any embodiment of the invention. In some embodiments, the computer system 210 can operate and/or process computer-executable code of one or more software modules, snaplets, bees, and/or other associated code and/or process of the aforementioned algorithms and processes. Further, in some embodiments, the computer system 210 can operate and/or display information within one or more GUIs. In some embodiments, the system 210 can comprise at least one computing device including at least one processor 232. In some embodiments, the at least one processor 232 can include a processor residing in, or coupled to, one or more server platforms. In some embodiments, the system 210 can include a network interface 235a and an application interface 235b coupled to the least one processor 232 capable of processing at least one operating system 234. Further, in some embodiments, the interfaces 235a, 235b coupled to at least one processor 232 can be configured to process one or more of the software modules 238 (e.g., such as enterprise applications). In some embodiments, the software modules 238 can include server-based software, and can operate to host at least one user account and/or at least one client account, and operating to transfer data between one or more of these accounts using the at least one processor 232.

With the above embodiments in mind, it should be understood that the invention can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on computer-readable storage media within the system 210 and on computer-readable storage media coupled to the system 210. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated.

In some embodiments of the invention, the system 210 can comprise at least one computer readable medium 236 coupled to at least one data source 237a, and/or at least one data storage device 237b, and/or at least one input/output device 237c. In some embodiments, the invention can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, the computer readable medium 236 can include hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 236 can transmit or carry instructions to a computer 240 and/or at least one user 231, including a router, private or public network, or other transmission device or channel, both wired and wireless. In some embodiments, the software modules 238 can be configured to send and receive data from a database (e.g., from a computer readable medium 236 including data sources 237a and data storage 237b that can comprise a database), and data can be received by the software modules 238 from at least one other source. In some embodiments, at least one of the software modules 238 can be configured within the system to output data to at least one user 231 via at least one GUI rendered on at least one digital display.

In some embodiments of the invention, the computer readable medium 236 can be distributed over a conventional computer network via the network interface 235a where the system embodied by the computer readable code can be stored and executed in a distributed fashion. For example, in some embodiments, one or more components of the system 210 can be coupled to send and/or receive data through a local area network ("LAN") 239a and/or an internet coupled network 239b (e.g., such as a wireless internet). In some further embodiments, the networks 239a, 239b can include wide area networks ("WAN"), direct connections (e.g., through a universal serial bus port), or other forms of computer-readable media 236, or any combination thereof.

In some embodiments, components of the networks 239a, 239b can include any number of user devices such as personal computers including for example desktop computers, and/or laptop computers, or any fixed, generally non-mobile internet appliances coupled through the LAN 239a. For example, some embodiments include personal computers 240a coupled through the LAN 239a that can be configured for any type of user including an administrator. Other embodiments can include personal computers coupled through network 239b. In some further embodiments, one or more components of the system 210 can be coupled to send or receive data through an internet network (e.g., such as network 239b). For example, some embodiments include at least one user 231 coupled wirelessly and accessing one or more software modules of the system including at least one enterprise application 238 via an input and output ("I/O") device 237c. In some other embodiments, the system 210 can enable at least one user 231 to be coupled to access enterprise applications 238 via an I/O device 237c through LAN 239a. In some embodiments, the user 231 can comprise a user 231a coupled to the system 210 using a desktop computer, and/or laptop computers, or any fixed, generally non-mobile internet appliances coupled through the internet 239b. In some further embodiments, the user 231 can comprise a mobile user 231b coupled to the system 210. In some embodiments, the user 231b can use any mobile computing device 231c to wireless coupled to the system 210, including, but not limited to, personal digital assistants, and/or cellular phones, mobile phones, or smart phones, and/or pagers, and/or digital tablets, and/or fixed or mobile internet appliances.

For the purposes of this disclosure the term "server" should be understood to refer to a service point which provides processing, database, and communication facilities. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as a Microsoft® Windows® Server, Mac OS X, Unix, Linux, and/or any other conventional operating system. Microsoft® and Windows® are registered trademarks of Microsoft Corporation, Redmond, Wash.

For the purposes of this disclosure a "network" should be understood to refer to a network that may couple devices so that communications may be exchanged, such as between a server and a client device, peer to peer communications, or other types of devices, including between wireless devices coupled via a wireless network, for example. A network may also include mass storage, such as network attached storage (NAS), a storage area network (SAN), or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, "Integrated Services Digital Networks" (ISDNs), "Digital Subscriber Lines" (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple user or client devices with a network. A wireless network may employ stand-alone ad-hoc networks, mesh networks, wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including "Long Term Evolution" (LTE), WLAN, wireless router (WR) mesh, or 2nd, 3rd, 4th, or 5th generation (2G, 3G, 4G, or 5G) cellular technology, or the like. Network access technologies may enable wide area coverage for devices, such as client devices with varying degrees of mobility, for example. For example, a network may enable RF or wireless type communication via one or more network access technologies, such as "Global System for Mobile communication" (GSM), "Universal Mobile Telecommunications System" (UMTS), "General Packet Radio Services" (GPRS), "Enhanced Data GSM Environment" (EDGE), 3GPP LTE, LTE Advanced, "Wideband Code Division Multiple Access" (WCDMA), Bluetooth®, 802.11b/g/n, or the like. A wireless network may include virtually any type of wireless communication mechanism by which signals may be communicated between devices, such as a client device or a computing device, between or within a network, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a near field communication (NFC) device, a personal digital assistant (PDA), a handheld computer, a tablet computer, a phablet, a laptop computer, a set top box, a wearable computer, an integrated device combining various features, such as features of the forgoing devices, or the like.

A client device may vary in terms of capabilities or features, and claimed subject matter is intended to cover a wide range of potential variations. A web-enabled fixed or mobile device may include a browser application that is configured to receive and to send web pages, web-based messages, and the like. The browser application may be configured to receive and display graphics, text, multimedia, and the like, employing virtually any conventional web-based language.

Figure 3:
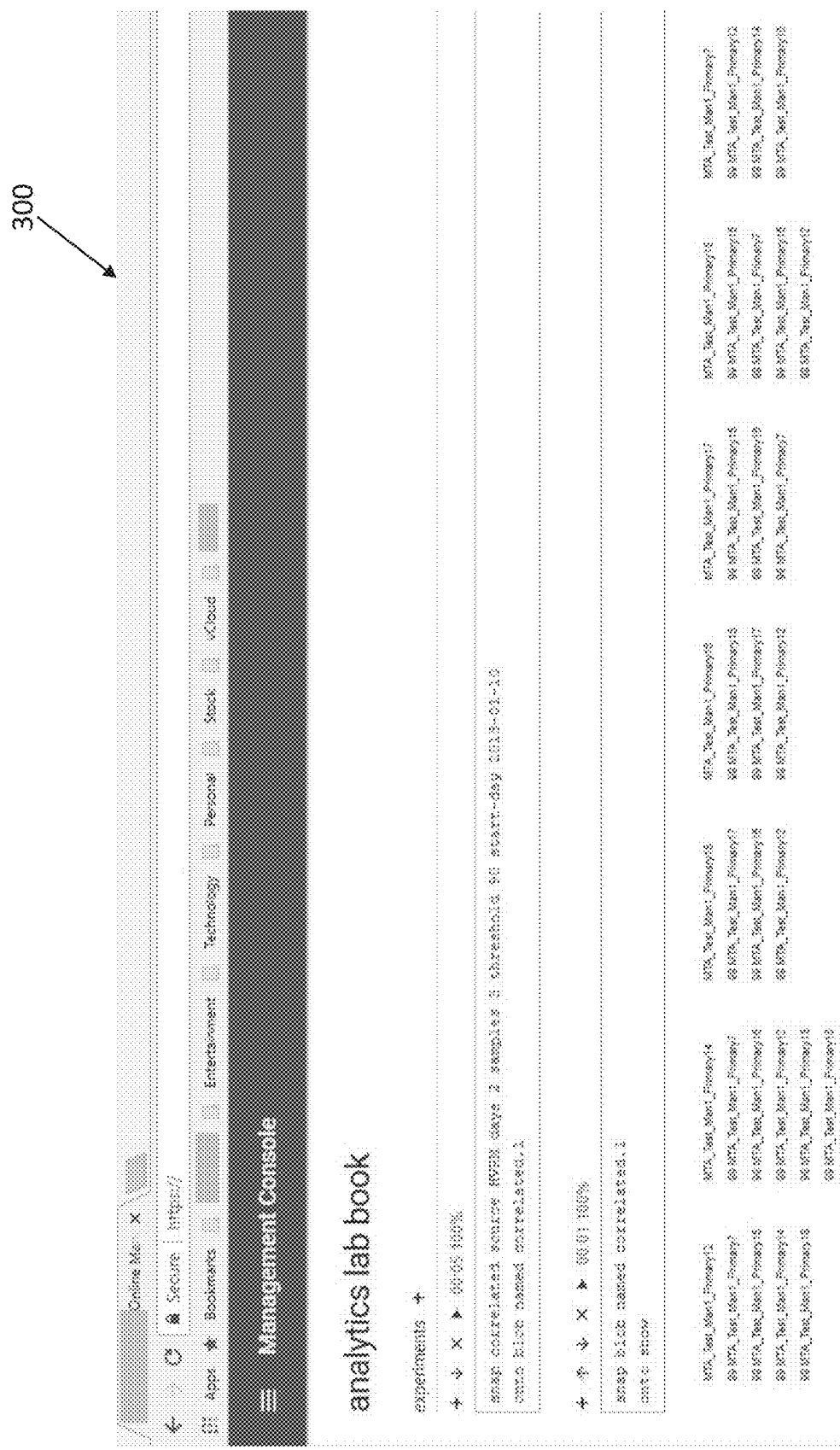
FIGS. 3 and 4 show non-limiting embodiments of a management console used in some embodiments of the invention.
Figure 4:
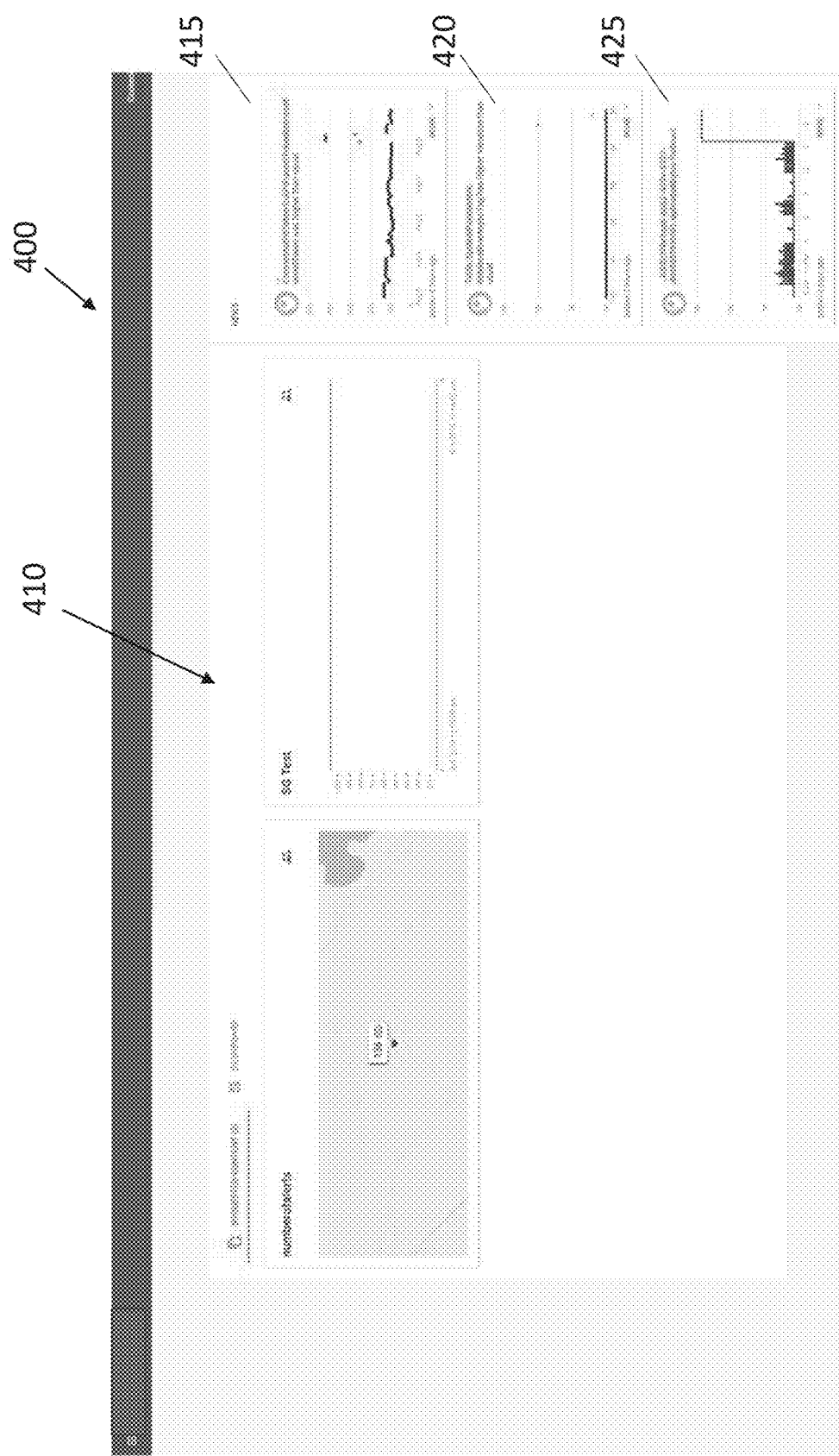

FIGS. 3 and 4 show a management console 300 in accordance with some embodiments. In some embodiments, the management console 300 is operated or processed by and/or coupled to the computer system 210 of FIG. 2. In some embodiments, the system can be used by a user to create and edit a lab book comprising editable cells containing code that can be run on a schedule to process incoming data (e.g., such as measurement data), return a result, and visualize data in text and/graphical formats. Further, as shown in the management console 400 of FIG. 4, some embodiments include one or more display windows 410 that can comprise one or more alerts, results, and locations. In some embodiments, the management console 400 can comprise one or more data windows such as data view windows 415, 420, 425.

Figure 5:
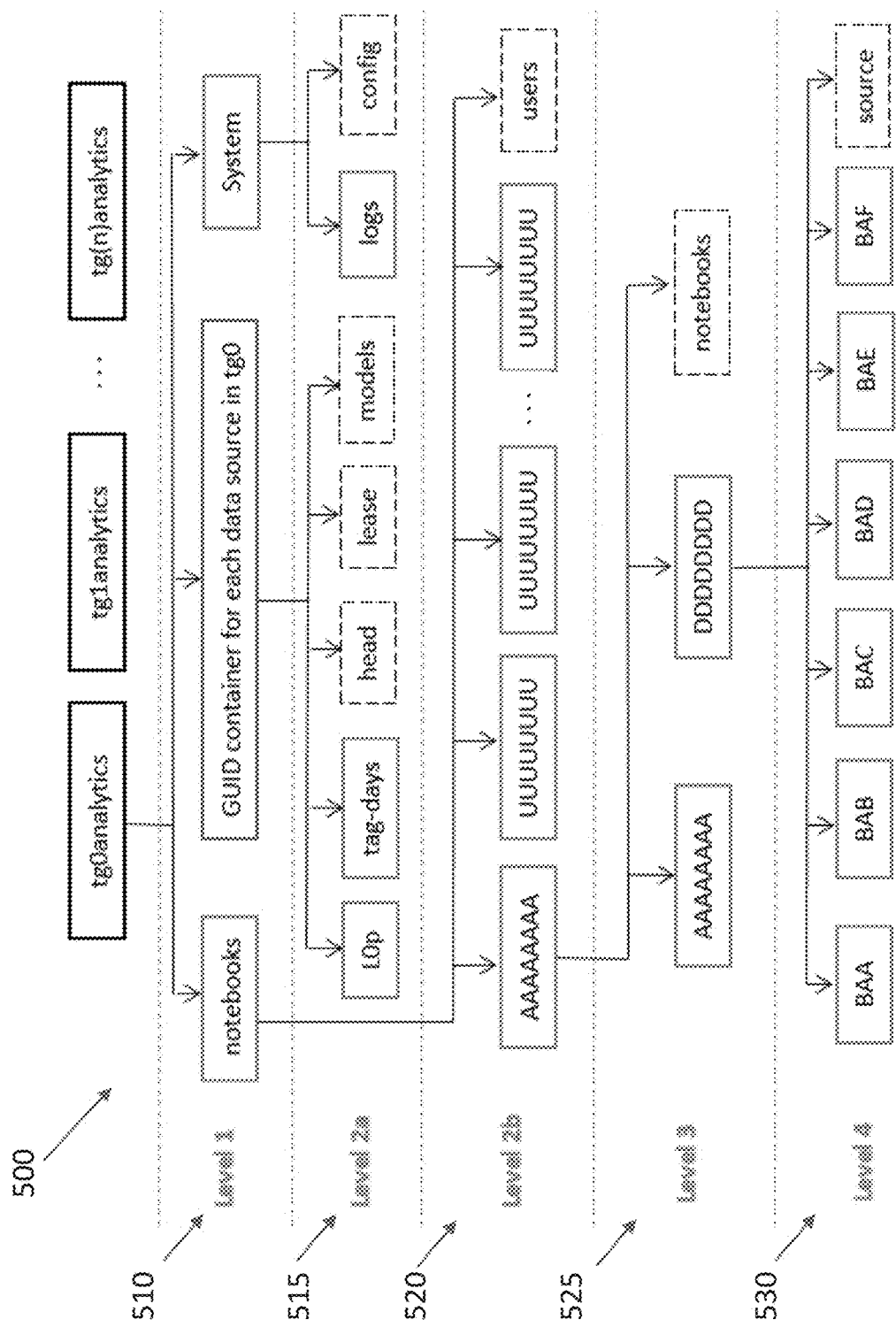
FIG. 5 shows a system architecture with multiple storage accounts in accordance with some embodiments of the invention.

Referring to FIG. 5, in some embodiments, the system can comprise a system architecture 500 with multiple storage accounts. In some embodiments, the architecture 500 includes a "Level 1" architecture 510. In some embodiments, each tenant group storage account (i.e. tg(n)analytics) can store GUID containers for each data source, such as "System" folder and "notebooks" folder. In some embodiments, the "System" folder or container can store a "logs" folder and a "config" blob. In some embodiments, the "logs" folder can contain one or more log blobs uploaded by the bees. In some further embodiments, the "config" blob can include the system configuration settings to be ran by each bee.

The notebook folder is a high-level folder that has several child folders as described further below. Further, in some embodiments, the "Level 2a" architecture 515 illustrates child folders as shown. For example, in some embodiments, the GUID container contains a "L0p" and/or "tag-days" folder along with other head, lease, and/or "models" blobs. The raw data from managed historian after being processed into a uniform format is stored in blobs inside L0p. This data after being processed by decode, zipper, and slicer is stored in tag-days folder which contains data received for a day in separate blobs for each tag.

Referring to the "Level 2b" architecture 520, the notebooks folder contains the system folder "AAAAAAAA", and/or other sets of folders with random 8-letter names, and a user's blob. In some embodiments, each of these folders except "AAAAAAAA" corresponds to a development user who has opened the lab notebook from the management console, and the users blob has the mapping of the random 8-letter user id with the corresponding user. In some embodiments, each new notebook created by a user in the analytics tile is stored inside of that user folder into a new folder with a random 8-letter name. In some embodiments, each notebook folder can store a random three-letter named folder for each cell created in that notebook by the user. In some embodiments, the "notebooks" blob in these folders has the mapping of random 8-letter notebook id for that notebook with a name given to it by the user in the analytics tile of management console.

Referring to the architecture "Level 3" architecture 525, each of the folders present in this level corresponds to a data source. In some embodiments, the "notebooks" blob present in this folder level has the mapping of 8 letters folder name of that data source with its data source GUID. Further, referring to architecture "Level 4" architecture 530, each folder present in this level corresponds to the specific code that is run against this data source. In some embodiments, folders BAA and BAB corresponds to MTA training and monitoring code respectively. In some further embodiments, folders BAC to BAF correspond to a step in the data processing. These folders store code, progress and schedule blobs.

Some non-limiting embodiments of notebook naming conventions are shown in Table 8 shown below.

TABLE 8 notebook naming conventions

| | |
|---|---|
| UUUUUUUU | user id (unique among all users) |
| NNNNNNNN | notebook id (unique for a user) |
| DDDDDDDD | data source id (unique for a data source) |
| CCC | cell id (unique for a notebook) |
| 1 | result id (unique for a cell) |
| notebooks/users | block blob with UUUUUUUU, email rows |
| notebooks/UUUUUUUU/ | user prefix |
| notebooks/UUUUUUUU/NNNNNNNN/ | notebook prefix |
| notebooks/UUUUUUUU/NNNNNNNN/CCC/ | cell prefix |
| notebooks/UUUUUUUU/notebooks | block blob with NNNNNNNN, name rows |
| notebooks/UUUUUUUU/NNNNNNNN/notebook | block blob with json for notebook |
| notebooks/AAAAAAAA/DDDDDDDD/source | block blob with data source GUID |
| notebooks/AAAAAAAA/DDDDDDDD/CCC/code | block blob with code |
| notebooks/AAAAAAAA/DDDDDDDD/CCC/progress | block blob with 96% canceled |
| notebooks/AAAAAAAA/DDDDDDDD/CCC/schedule | block blob with every 10 days |
| notebook/UUUUUUUU/NNNNNNNN/CCC/0 | append blob first result |
| notebook/UUUUUUUU/NNNNNNNN/CCC/1 | append blob second result |
| notebook/UUUUUUUU/NNNNNNNN/blobs/ | folder for notebook blobs |
| notebook/UUUUUUUU/NNNNNNNN/streams/ | folder for notebook streams |

Figure 6:
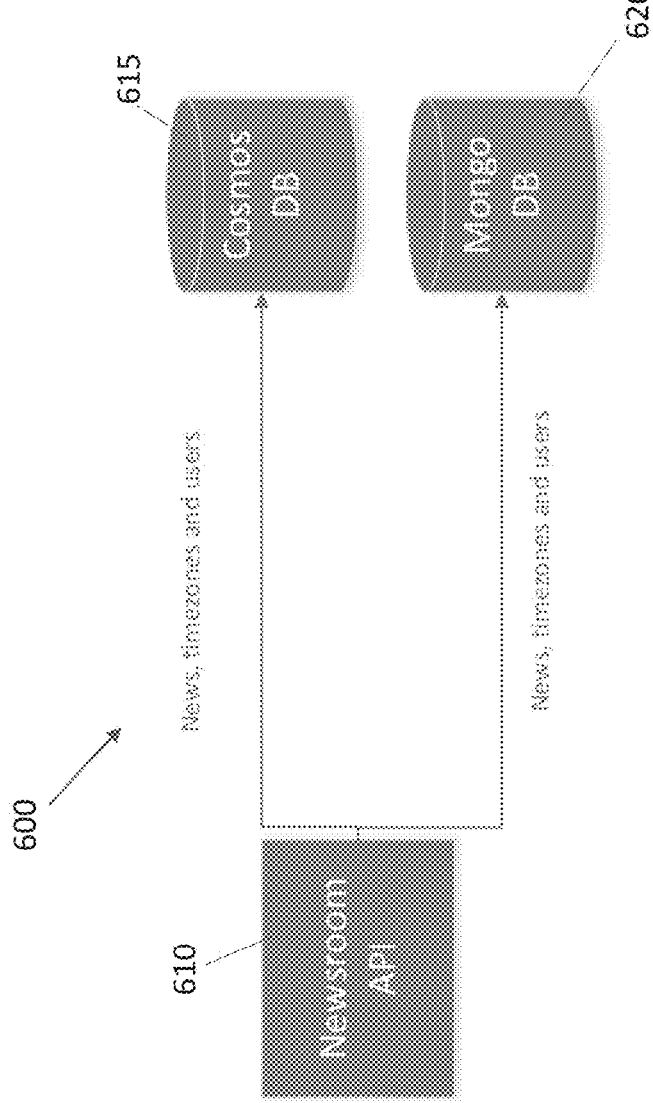
FIG. 6 is a managed historian database schema in accordance with some embodiments of the invention.

In some embodiments, stream control can be provided by:
notebook/streams/my.stream/10000001
notebook/streams/my.stream/head_in
notebook/CCC/streams/my.stream/head_out FIG. 6 is a managed historian database schema 600 in accordance with some embodiments of the invention. In some embodiments, the managed historian database schema 600 can comprise a "CosmosDB" database 615. In some embodiments, the system can facilitate news collection for all tenants except dedicated tenants. In some embodiments, a newsroom API 610 can couple to one or more databases, such as "CosmosDB" database 615 and/or "MongoDB" database 620. In some embodiments, the collection name is "news". In some embodiments, the collection uses the tenant ID as the partition key. In some embodiments, the time zone document is in collection for each tenant. In some embodiments, the collection name is "configurationcollection". In some embodiments, the user document is in collection for each user of a tenant. In some embodiments, the collection name is news, and the collection uses the "News_tenantID_UserId" and has the partition key. In some embodiments, the for the dedicated tenants, the collections are as follow: a news collection for each dedicated tenant, and the collection name is: news_tenantgroup (e.g. news_tg0), and the collection uses the tenant ID as the partition key.

Some embodiments of the system can process one or more swarms. "Swarm" is the name given to a Microsoft® Azure® VM scale set which performs the computational tasks for analytics. In some embodiments, the architecture of the swarm consists of one Microsoft® Azure® VM scale set, a Linux operating system, a VM size of standard_A1, no auto-scaling, twenty maximum supported instances, and four "bee" processes per instance. Microsoft®, and Azure® are registered trademarks of Microsoft Corporation in the United States and/or other countries.

Some embodiments include system processes comprising bees. In some embodiments, each VM in a Microsoft® Azure® scale set can run four bee processes, and each bee can operate synchronously, performing one job at a time. In some embodiments, a bee lifecycle can comprise checking for a job to do, and/or continuously checking until a job is available. In some embodiments, a job can be ready to be picked up by a bee when the elapsed time since its progress file has been completed is larger than its schedule. In some embodiments, these jobs can be found in an analytics data storage account system container. In some embodiments, the jobs executed through the management console can have priority over the system level jobs. In some embodiments, the bee can perform one or more jobs. In some embodiments, the job will typically be a snaplet, and the specific actions of the job will depend on the snaplet. In some embodiments, the processes described above can be repeated one or more times.

Some embodiments include one or more logging processes and/or a logging utility that can enable all system objects and framework software to report operational errors, code flags, and statistics. This function can enable technical support users to diagnose and system errors and/or performance problems. In some embodiments, each bee can maintain one active log file at a time, on a local disk. In some embodiments, the bee can write messages to the log file synchronously as it performs jobs. Some embodiments include bee processes that have a dedicated thread for uploading the log files. In some embodiments, when the bee process starts, it can upload any existing log files for its bee ID (there may be existing log files, for example if the process crashed). In some embodiments, the current log file can be uploaded every thirty minutes and/or upon reaching 1 GB file size (not configurable). In some embodiments, the log files can be uploaded to the analytics data storage account, system container and logs folder (system/logs). In some embodiments, any additional log files on the local disk for this bee can also be uploaded. In some embodiments, if the upload fails, it does not retry until the next thirty-minute interval. In some embodiments, every upload creates a new blob in the Microsoft® Azure® storage account, and log files are not appended. In some embodiments, after uploading, the local file is deleted and a new one is created.

Some embodiments include a naming convention including, but not limited to, "<Timestamp>-<MachineName>-<BeeId>-<ProcessId>". In some embodiments, the timestamp is a UTC timestamp up to seconds, with no spaces or punctuation. In some embodiments, the "MachineName" can comprise a 5-digit number representing the swarm VM instance number. In some embodiments, the "BeeId" can comprise a digit 1-4 representing the bee running on the VM. In some embodiments, the "ProcessId" can be a process ID of the bee process. In some embodiments, an example can comprise "20181004161008-00007-4-23167".

In some embodiments, each line of a log file can contain a timestamp comprising UTC time with milliseconds precision, and/or a log level within information or error, and/or text comprising any additional text describing the action, such as beginning or ending a cell, or wait time. In some embodiments, each section of the line is comma separated, and the text part cannot contain commas or new lines. In some embodiments, the first line in the log file always contains the notebook version.

In some embodiments, the log files are uploaded every 30 minutes and each upload creates a new log file. In some embodiments, the log files are uploaded more frequently and appended instead of creating a new file each time. For example, in some embodiments, the log files can be uploaded every 5 minutes, and appended to the same file for 1 hour, and then a new file is created.

As described earlier, some embodiments of the invention include data processing units called snaplets. Table 9 below lists some non-limiting parameters that are available for these snaplets and the available fields for select field operation.

TABLE 9 shows non-limiting parameters that are available for snaplets and the available fields for select field operation.

| Snaplets Enrolled | Description | Parameters | Select Field/s |
|---|---|---|---|
| "sum", "min", "max", "avg" | The sum, min, max and avg snaplets are used to calculate sum, min, max or average of incoming vtq data respectively | field by and minutes hours days | - |
| blob | The blob snaplet is used to write information to a blob or read information from a blob | named | - |
| blobs | The blobs snaplet is used for listing blobs | container.name prefix suffix / - . | blob, name container.name blob.size blob.leased blob.lease.expired blob.modified blob.text |
| cor | The cor snaplet groups a tag with other tags in the data source that varies in a linear fashion | - | score primary. related. |

TABLE 9-continued shows non-limiting parameters that are available for snaplets
and the available fields for select field operation.

| Snaplets Enrolled | Description | Parameters | Select Field/s |
|---|---|---|---|
| count | The count snaplet in used to count the number of rows in incoming data | by<br>and | - |
| distinct | The distinct snaplet is used to filter output data to only one of given fields | by<br>and | - |
| enta | The enta snaplet is for reporting the entropy stories | window<br>bins | - |
| entropy | The entropy snaplet is for calculating entropy | window<br>bins | - |
| every | The every snaplet is used to run cells on schedule | minutes<br>hours<br>days | - |
| fork | The fork snaplet is used to run parallel processes in a cell | named | - |
| golden | The golden snaplet calculates the trigger probability of the incoming data to be anomalous | consec<br>chance<br>train<br>coef<br>for | id<br>condition<br>start<br>end |
| historian | The historian snaplet is used to send vtqs to a managed historian using CSV/Json upload | url<br>token<br>connection | - |
| incoming | The incoming snaplet is used to read L0p files | - | source.id<br>container.name<br>blob.name<br>blob.offset<br>blob.size |
| "decode", "zipper" and "slicer" | The decode, zipper and slicer snaplets are used for processing L0p data into L1, L2 and tag-days respectively | - | - |
| "keep", "toss" | The keep and toss snaplets are used to keep and toss the rows from the incoming data respectively | If<br>Is<br>contains<br>or<br>and<br>gte<br>lte<br>after<br>before<br>first<br>top<br>field<br>by<br>days | - |
| lake | The lake snaplets is used to write data to Data Lake | folder<br>file<br>field<br>/<br>\\<br>.<br>and | - |
| "lm.train", "lm.predict" and "lm.report" | The lm.train, lm.predict and lm.report snaplets are used to training, prediction and reporting the linear model | "lm.predict"<br>as<br>diff<br>percent, error | - |
| logs | The logs snaplet is used to display log blobs from the bees in swarm | since<br>hour ago<br>hours ago | timestamp<br>level<br>bee.version<br>bee.start<br>blob<br>cell.prefix |

TABLE 9-continued shows non-limiting parameters that are available for snaplets
and the available fields for select field operation.

| Snaplets Enrolled | Description | Parameters | Select Field/s |
|---|---|---|---|
| | | | cell.start<br>text<br>code<br>progress<br>schedule |
| "lstm", "lstm.train", "lstm.predict", and "lstm.report" | The lstm.train, lstm.predict and lstm.report snaplets are used to training, predicting, and reporting lstm model and stories | "lstm"<br>seed<br>predict<br>steps<br>"lstm.predict"<br>as<br>diff<br>percent, error | - |
| merge | The merge snaplet is used to insert vtqs in appropriate order of timestamp in summary blobs | folder | - |
| mta.join | The mta.join snaplet joins vtqs from different tags sourced from L0p through incoming snaplet or summary blobs that have single timestamp into one long row with multiple values | data<br>model<br>start<br>days | primary,<br>predictor. |
| news | The news snaplet posts the news story to Microsoft ® Azure ® cosmos db | since<br>hour ago<br>hours ago | datetime<br>algorithm<br>fqn<br>tag. name<br>source.name<br>tenant, id<br>source.id |
| noise | The noise snaplet is used to generate noise data | distribution normal<br>distribution uniform<br>sigma<br>seed | - |
| notebook | The notebook snaplet is used to write notebook code cells to system notebook | write<br>overwrite<br>limit | - |
| "notebooks. suspend", "notebooks.resume" and "notebooks.purge" | The notebooks, suspend snaplet suspends inactive data sources, notebooks. resume resumes the suspended data sources and notebook.purge deletes the data sources notebooks that are no longer needed | - | - |
| progress | The progress snaplet is used to display the current blob name being processed on top of the running cell | by<br>and | - |
| purge | The purge snaplet is used to delete blobs | container, name<br>blob.name<br>entire | - |
| reporters | The reporter snaplet reads L2 to look for anomaly and passes it to various reporters | - | - |
| select | The select snaplet is used to select columns of the incoming data to pass it onto next line | field<br>fields<br>and | - |

TABLE 9-continued shows non-limiting parameters that are available for snaplets
and the available fields for select field operation.

| Snaplets Enrolled | Description | Parameters | Select Field/s |
| --- | --- | --- | --- |
| show | The show snaplet is used to display the results on the screen | title<br>bleep | - |
| sources | The sources snaplet is used to access the specific data source for any of the processes | list | lapse<br>tag.count<br>decode.backlog<br>zipper.backlog<br>slicer.backlog<br>news.backlog<br>decode.lag<br>zipper.lag<br>slicer.lag |
| stream | The stream snaplet is used to store the result for parallel processing across the cells | named | - |
| tags | The tags snaplet is used to list the tags present in a data source or solution | order.by<br>named<br>and | tag.name<br>tag.type<br>tag.alias<br>tag.eng_unit<br>tag.location<br>tag.timezone<br>tag.datatype<br>tag.id<br>tag.fqn |
| tisa | The tisa snaplet is used to trigger System Cycle Time i.e. tisa news stories | - | - |
| vtqs | The vtqs snaplet is used to extract vtq data from tag-days, summary files and incoming | - | timestamp<br>value<br>quality<br>color<br>source.name<br>tag.name<br>tag. |
| wave | The wave snaplet is used to generate data | shape<br>period<br>phase<br>in<br>count<br>steps<br>amplitude<br>offset<br>hour<br>hours<br>day<br>days<br>op<br>start | - |
| XTCA | The XTCA snaplet is used to trigger high/low anomaly news stories | - | - |
| XTFH | The XTFH snaplet is used to trigger flatline anomaly news stories | - | - |

Some non-limiting examples of a snaplet include a "golden" snaplet, with examples shown in Table 10. In some embodiments, the golden snaplet can calculate the trigger probability of the incoming data to be anomalous.

TABLE 10 lists a snaplet example

| Name | Description | Data type | Example |
|------|-------------|-----------|---------|
| consec | The number of consecutive item to trigger a news story | Int | 10 |
| chance | The chance at which the consecutive will happen | Int | 5 |
| train | The amount of data point used to baseline the golden snaplet | Int | 30 |
| distf | The distance from the average at which we evaluate high and low | Int | 1 (default) |

This is an example of how to use the golden snaplet; "onto golden consec 10 chance 5 train 30 distf 1"

This section describes how the golden stores its state on blob. The template goes as follows and Table 11:
<count_states><tag_id_X><model_X> . . .

TABLE 11

| | | |
|---|---|---|
| count_states | The number of golden models per id | size_t |
| tag_id_X | The tag id of an instance of the model | GUID (binary) |
| model_X | The object that holds the golden rule information | model struct model { running running_stats; uint64_t start_time = 0; // seconds since 1601 uint64_t span = 0; // seconds uint32_t consec_low = 0; uint32_t consec_high = 0; void reset ( ) { running_stats.reset ( ); start_time = span = consec_low = consec_high = 0; } }; |

This is the snaplet which stores the news story. This is an example of how to use news snaplet "onto news".

In some embodiments, a "Blob" snaplet can be used to write information to a blob or read information from a blob. In some embodiments, this can be highly useful to make custom commands. Table 12 shows example parameters.

TABLE 12 shows example parameters

| Name | Description | Data type | Example |
|------|-------------|-----------|---------|
| Named | The name of the blob from where the data is to be read or the blob to which data is to be written | string | Orange.correlated.1 |

An example of blob usage includes; snap correlated source sys days 2 samples 3 threshold 95 start-day 2018-01-20, onto blob named sys.7.

In some embodiments, a sources snaplet can be used to access the specific data source for any of the processes. The only input is the name of the data source which is entered immediately after the source snaplet and the space between them. One example of using source snaplet as below, snap correlated source sys days 2 samples 3 threshold 95 start-day 2018-01-20

An "Onto" snaplet can be used to transfer the result of a line of code to the next line (of one snaplet to the other one). Results can be shown using show snaplet, or it can be sent to another snaplet for further processing as shown:

snap hcal source sys from mar to aug
onto show
snap hcal source sys from mar to aug
onto mta.monitoring models sys.mtatrain Some embodiments include a show snaplet that is used to display the results on the screen. Also, it can be used with errors and backlog to display the errors recorded and the work backlog accumulated:

"onto show title outcome"
"Show errors"
"Show backlog"

Some embodiments include a tags snaplet that is used to list the tags present in a data source or solution.

Parameters can include a name of "Solution" if the tag is accessed for a solution, a "String" data type, with an example of "Name of the solution". Further, a name of "Source", comprising a data source if the tag is accessed for a data source, a "String" data type, and a "Name of the data source" example, "Snap tags source sys".

Some embodiments include a notebooks.purge [1091683] where the purge cell lives in the "boot sector" (system/notebook/AAAAAAAA/AAAAAAAA). Cell ID: AAB. Schedule: every 1 days.

In some embodiments, when the notebooks.purge snaplet runs, the system can iterate through each existing system notebook. In some embodiments, notebooks with no source blob are removed. In some embodiments, this can happen when a notebook previously failed to be completely deleted, with only some of its blobs deleted. In some embodiments, if the source blob exists but has invalid or no content, the system does not check the contents, and notebook won't be deleted. In some embodiments, notebooks with no corresponding data source container are removed. In some embodiments, this can happen when data sources are deleted through a managed historian configurator API. In some embodiments, if the data source container exists, but is not accessible (such as server not available or timeout), an exception will be logged and the notebook won't be deleted. In some embodiments, if a container exists, but is empty, the system does not check container contents, and does not delete the notebook. In some embodiments, if notebook deletion fails (such as a code blob having an active lease), the system can set a progress blob to 100%, and deletes all other blobs except code. The purge snaplet is not expected to take a long time to run, and one factor is the number of existing notebooks.

Some embodiments include one or more rules. Some embodiments include a golden rule algorithm governing a probability of consecutive values within a decade (10 years). In the code below, the system can calculate the probability of 10 consecutive (consec) value with a 5% chance (0.05) of it happening. Using the average, the normalized standard deviation and probability, the system can compute a lower bound and upper bound value to compare the actual value against and trigger a news story.

In some embodiments, the "XTCA" snaplet can be used to trigger high/low anomaly news stories, where the system can report a story when a single tag goes above or below its normal range. In some embodiments, the trigger only works for analog tags. In some embodiments, the reports can be on "local" time zone. In some embodiments, the report can run once a day, and reports on data from previous day (yesterday). In some embodiments, the system requires eight full days of data as of previous midnight. In some embodiments, the system requires that there are no nulls in data for last 8 days. In some embodiments, the system requires at least thirty unique values in data for last 8 days. In some embodiments, the system can create reference periods of hourly means, and/or day before yesterday, and/or day a week before yesterday (same weekday), and/or seven-day period prior to yesterday. In some embodiments, the system can report if there are at least four hourly means from yesterday that are three or more standard deviations higher than the mean for all three reference periods, and/or at least four hourly means from yesterday that are standard deviations lower than all three reference periods.

In some embodiments, the XTFH snaplet can be used to trigger flatline anomaly news stories. In some embodiments, the system can report a story when a tag flat lines (i.e., when the tag value hasn't changed for a specific period of time). In some embodiments, the system can use analog tags. In some embodiments, the specified time period is at least 90 minutes. In some embodiments, the flat lines are only reported if system is currently in a flat-line condition at the time the algorithm is run. In some embodiments, the flat line duration must be at least twice as long as longest flat line found in the last fifty value changes. In some embodiments, the flat line stories won't be reported twice for the same tag unless that tag comes out of the flat line condition first.

Some embodiments include a "TISA" ("State Cycle Time") snaplet. In some embodiments, the TISA snaplet can be used to trigger a system cycle time (i.e. TISA news stories). In some embodiments, the system reports a story when a state cycle time is considerably longer or shorter than usual. Some embodiments include maintaining a dictionary of five states. In some embodiments, the tag must not have more than five states since the start of analysis by an algorithm. (distinct values, not including NULL). Must have at least 40 past cycles for the given value, latest 40 cycles per state are considered. Reports when less than 75% of min cycle time or above 125% above max cycle time. Last 40 cycles prior to "anomaly" must have mean±standard deviation >10. At least 3 consecutive cycles out of normal range. Out of range cycles must be all higher than normal or all lower than normal. In 10 years with true normal data, I should have less than 5% chance of seeing this story.

In some embodiments, the entropy algorithm can monitor the distribution of tag values and triggers a news story if there are significant changes in the distribution. In some embodiments, the entropy is calculated with a predefined window length of 360 samples. In some embodiments, the minimum and maximum range of each window can be divided into 100 equally spaced bins. In some embodiments, the "scaled entropy" value is calculated as sum(−log(p(v))*p(v))*(max−min). Some embodiments include at least fourteen past cycles evaluated for the given tag before triggering a story. In some embodiments, the "golden rule" algorithm can be used to determine if the anomaly is "abnormal" enough using a rule of 5% false positive chance of no model change in 10 years. Some embodiments must include at least two consecutive cycles being read out of normal range to trigger a story. In some embodiments, the out of range cycles must be all higher than normal or all lower than normal to trigger a story. In some embodiments, the story can show six cycles before the first higher/lower cycle begin and two after.

Figure 7:
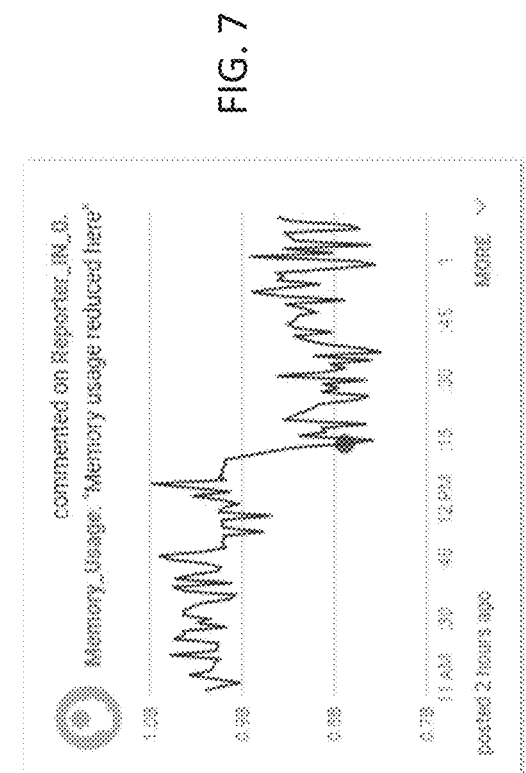
FIG. 7 shows a management console data windows in accordance with some embodiments of the invention.
Figure 9:
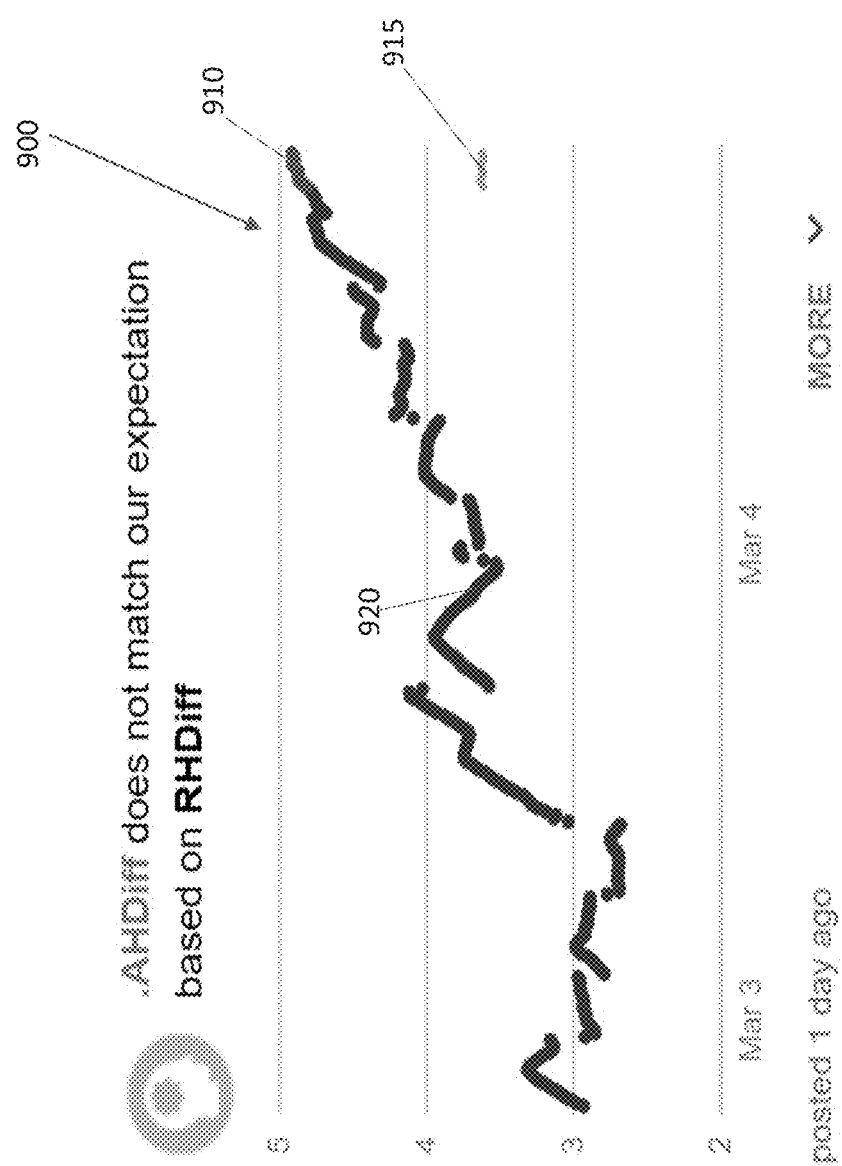
FIG. 9 shows a management console sample data display in accordance with some embodiments of the invention.

In some embodiments, the "Comments" stories can be generated by the API. For example, FIGS. 7 and 9 show management console data windows in accordance with some embodiments of the invention, and illustrates a non-limiting example of a comment added by a user, showing where on the data the user added the comment. FIG. 9 illustrates a console display in accordance with some embodiments of the invention. In some embodiments, data can be displayed as shown where the part 910 is actual data that doesn't match expectation. In some embodiments, the part 915 is expected data, and the dark green part 920 is the actual data. In some embodiments, the data can be displayed in one or more colors to distinguish between types of data. For example, in some embodiments, the part 910 can be indicated as red, and/or light green can be used for part 915, and/or dark green can be used for part 920.

Figure 8:
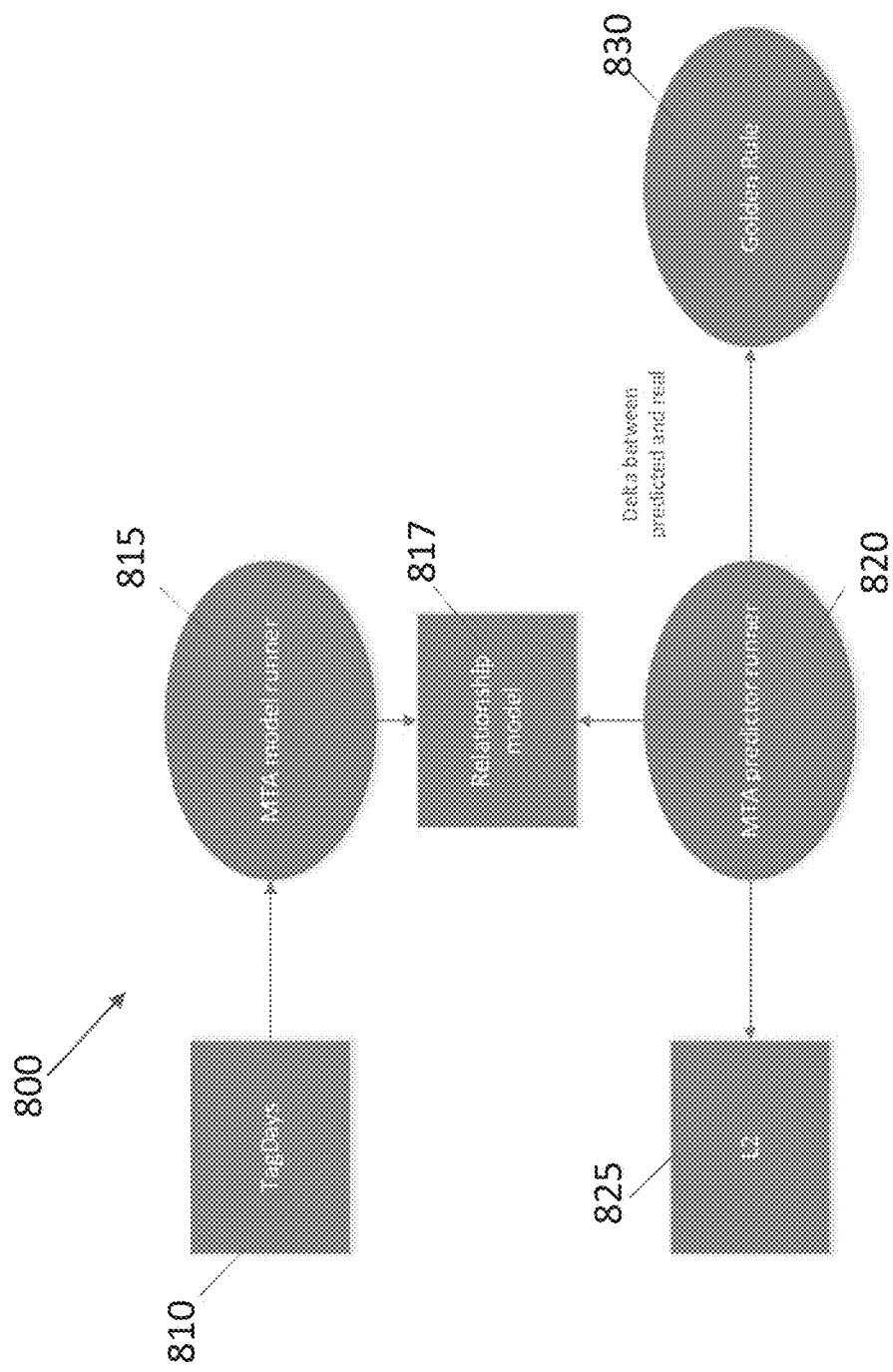
FIG. 8 shows a multi-tag anomaly detection workflow diagram in accordance with some embodiments of the invention.

Some embodiments include multi-tag anomaly detection. For example, in some embodiments, an algorithm can inform the user when the data is diverging from the predicted value based on a related tag(s). In some embodiments, the process of this algorithm is done in multiple parts as illustrated in the workflow diagram of FIG. 8. The first flow is using the MTA model runner 815. MTA model runner 815 grabs a range of tag days 810 and does a 10 minutes' average resample. With the resample, we compute the linear model 817 using moments and output the parameters. The second flow is about predicting using the related tag 825 with MTA predictor runner 820. Using that value, we take the delta with the actual value and feed it to the golden rule algorithm 830. If the golden rule reports an anomaly, we generate a news.

In some embodiments, the system can use 10 minutes' averages for modelling and monitoring the data. In some embodiments, the training period is configurable from the process arguments (the tuning was done using a week of data). In some embodiments, the "golden rule" algorithm can be used to determine if the anomaly is "abnormal" enough using a rule of 5% false positive chance of no model change in 10 years. In some embodiments, the system can apply a factor of 5 on the golden rule distance. In some embodiments, the system can have a 10-consecutive cycle for an anomaly to be triggered (1 hour and 40 minutes). Some embodiments can utilize a two-tag relationship only (primary and a single predictor). In some embodiments, the system can keep the maximum within the golden rule during baselining and make sure that the new data is above that maximum for news trigger.

In some embodiments, the system can include a stored training data model. In some embodiments, a training MTA model can be stored to blob. The template is as follows in the Table 13.

TABLE 13

| Proto_name | Name of the proto. In this case "mtatrain" | String |
|---|---|---|
| NewLine | New line "\n" | Char |
| Primary_tag_id | Primary tag id | GUID (binary) |
| Predictor_tag_id | Predictor tag id | GUID (binary) |
| Linear_parameter_a | This is the "a" parameter from the linear equation (a * x + b) | double |
| Linear_parameter_b | This is the "b" parameter from the linear equation (a * x + b) | double |

All training models are appended to the file. Some embodiments include a header to the file to provide a description and/or metadata of the content. A non-limiting snaplet example, using the notebook form the MC, on how to have a successful flow of MTA using snaplets. In some embodiments, the first cell can be used to generate the correlated tags can comprise "snap correlated source sys days 2 samples 3 threshold 95 start-day 2018-01-10" and "onto blob named sys.7". A second cell can comprise generate the training of the mta models and can comprise "snap blob named sys.7", "onto mta.train start 2018-02-01 days 7", and "onto blob named mtatrain.6", and "onto show". In some embodiments, the third cell can be used to monitor the incoming L0 data and apply the prediction and the golden rule to trigger a news story by "snap hcal source sys from feb to feb", and "onto mta.monitor models mtatrain.6", and "onto golden consec 10 chance 5 train 30 distf 1", and "onto mta.report systems sys.7 models mtatrain.6", and "onto news".

In some embodiments, stories from the same algorithm for the same tag can be prevented from being reported more than once every 3 days. In some embodiments, this does not apply for the news generated regarding the comments. Some embodiments include calculation of a story score. In some embodiments, for calculation of a story score, score in DFS for each story (hilo=standard deviations from normal, time in state=% diff from normal, flatline=number of points since flatline half as large? Or (flatline length)/(average maximum flatline per day)).

In some further embodiments, news can be displayed based on scoring. In some embodiments, the scoring is out of 100, and can be divided into two sections, fifty for each section. In some embodiments, the first fifty points are given if the story section has been clicked (e.g., in Wonderware® online Insight) at least once. For example, in some embodiments, if the story A has been clicked at least once (not worried about the number of times), fifty points will be given. In some embodiments, if it has not been clicked at all, no points are given. Further, the second point depends on the story score. This value can be can be found for each of the generated stories in Microsoft® Azure® cosmos DB discussed earlier. In some embodiments, there are set no minimum/maximum points for this score, and irrespective of its value, it is normalized to a value, out of 50. In some embodiments, on adding the points of these two sections, every story will have a final score out of 100. Then, the twelve stories with top scores are distributed to a newsfeed tile in Wonderware® Online Insight.

Some embodiment can include and/or utilize REST APIs. In some embodiments, a news feed REST API can be hosted as part of an "iHistory" (i.e. the following URL can be used to get newsfeed user stories). The following sections in Table 14 describe each properties of the data model:

TABLE 14

| Property Name | Description | Type |
|---|---|---|
| id | Id of the news story | String |
| fqns | Array of fqn | Array of string |
| primaryFqn | Since we can have multiple fqn on the news story, we have a primary fqn to have a based reference | String |
| Score | Score of the news story | Number |
| Algorithm | To which algorithm does the story belong to. (i.e.: enta, xtca, etc.) | String |
| Author | Who is the author of the news story | String |
| reportedDatetime | When was the news story reported | ISO8601 string datetime |
| Data | Array of data points | Double, ISO8601 string datetime, bool |
| source | Source of the news story | String |
| State | Based on the condition of the news story, in which state is the story when the anomaly was triggered | String |
| chartType | Which type of chart we want to display (i.e.: line, bar, . . .) | String |
| Units | What is the units of the fqns | Array of string |
| Timezone | What is the name of the timezone of the news story | String |
| News_starttime | When did the anomaly start | ISO8601 string |
| News_endtime | When did the anomaly end | ISO8601 string |
| Tz | Time zone offset of the news story | String |
| Location | The news story security | String |
| Drill_starttime | This is used for the drill through. This is the start time in ISO8601 of when we drill through | ISO 8601 datetime |
| Drill_endtime | This is used for the drill through. This is the end time in ISO8601 of when we drill through | ISO 8601 datetime |
| Drill_fqn | Array of fqns used when drilling through | Array of string |
| User_comment | Additional comment provided by the user | string |
| User_ID | User email | string |
| TenantId | Id of the tenant | string |

Figure 10:
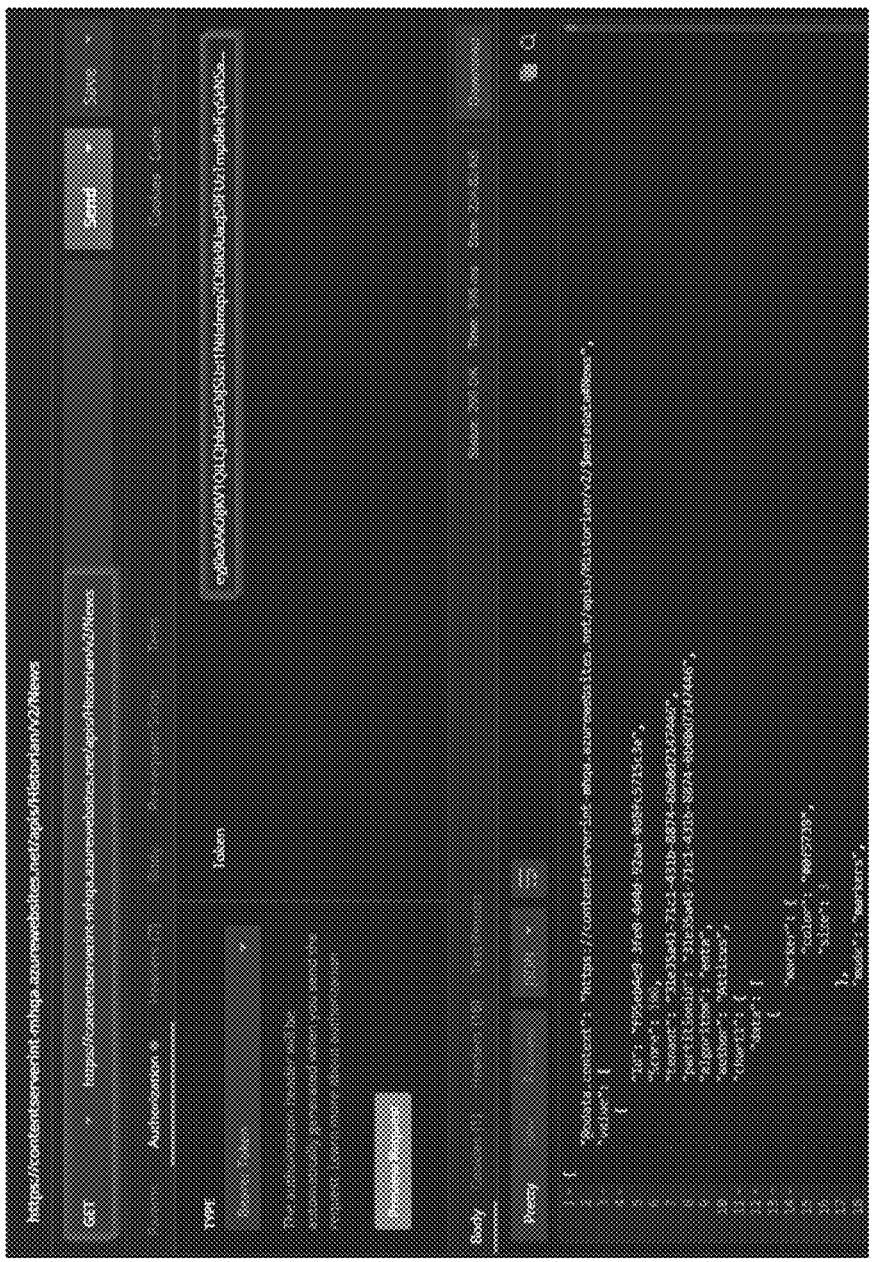
FIG. 10 depicts how to invoke a "Get method of News" process in accordance with some embodiments of the invention.

Referring to FIG. 10, some embodiments of the invention include a "News GET Method" using input parameters such as an API Token in a "POSTMAN" depicting how to invoke "Get method of News". In some embodiments, in URL, the value of contentserverint-mhqa.azurewebsites.net will vary based on environment. FIG. 11 depicts how to invoke "Get method of News" process in accordance with some embodiments of the invention. In some embodiments, the system includes a "News POST Method". In some embodiments, the input parameters can comprise a parameter one comprising a API Token, and/or a parameter two comprising a "JSON Object of News" to be posted, and a script shown in Table 15:

TABLE 15

```
{
    "_id": "59e30911b8d68147fcb3d71a",
    "fqns": [string],
    "primaryFqn":string
```

TABLE 15-continued

```
"score": number
"algorithm": string,
"author": string,
"reportedDatetime": string (ISO_FORMAT),
"data":[{
    "value":double,
    "timestamp":string (ISO_FORMAT),
    "state":string (good/bad)
}],
"source": string,
"state":string (high/low),
"chartType":string,
"units": [string],
"news_starttime": string (ISO_FORMAT),
"news_endtime": string (ISO_FORMAT),
"drill_starttime":string (ISO_FORMAT),
"drill_endtime":string (ISO_FORMAT),
"drill_fqn":[string],
"user_comment":string
}
```

Figure 12:
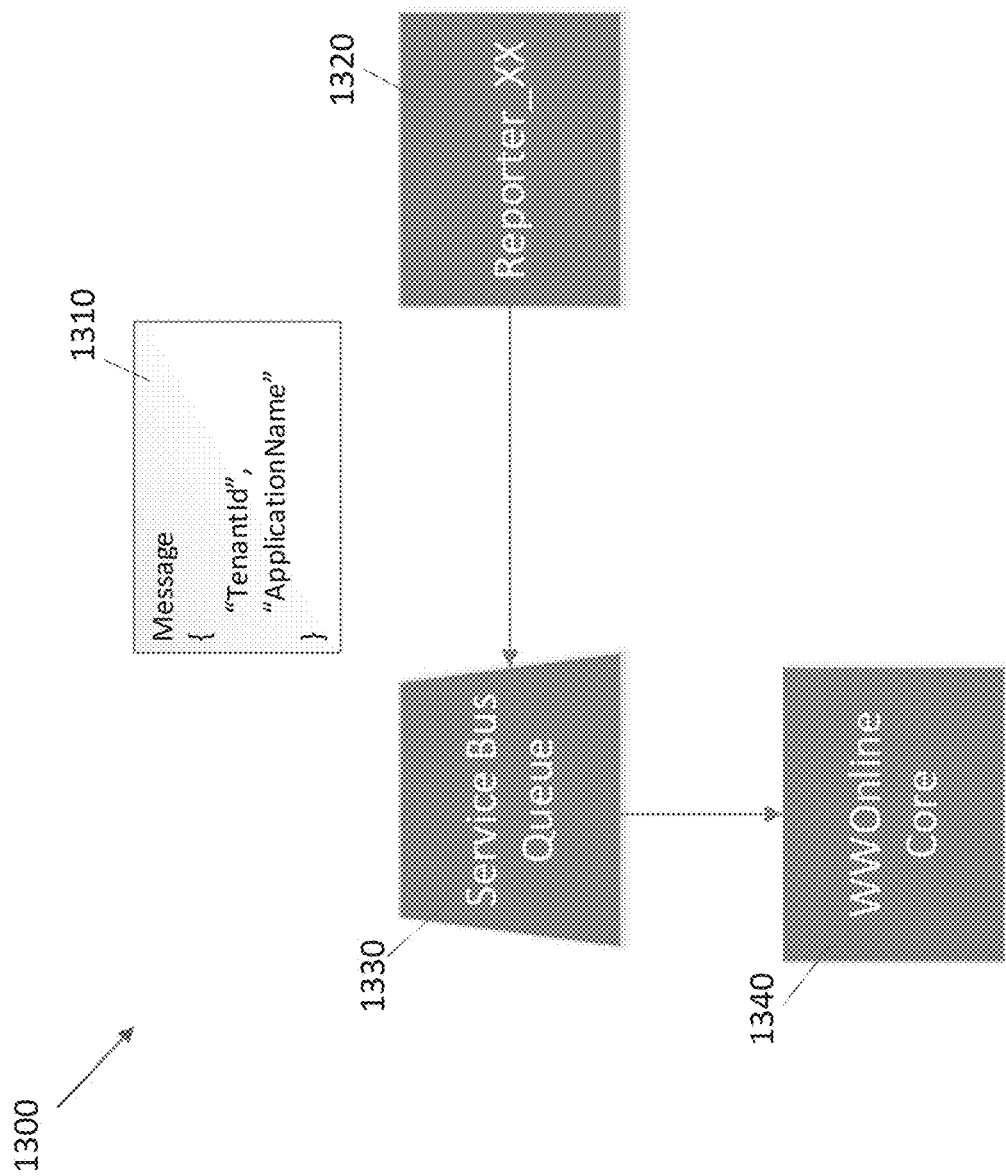
FIG. 12 shows a process of reporting of an historian event in accordance with some embodiments of the invention.

In some embodiments, in URL, the value of content-serverint-mhqa.azurewebsites.net can vary based on environment. FIG. 12 depicts how to invoke "POST method of News" process 1300 in accordance with some embodiments of the invention. Some embodiments can define location specifications. In some embodiments, when an API call is made, the system can validate that the user is allowed to add a news story with the list of functions provided. In some embodiments, the system can make an API call to a WWOnline Core with a filter of list of functions provided. With the response, the system can compare the result and make sure they match. Following that step, the system can find the most restricted common denominator of location associated with the story. See examples in the Table 16 below:

TABLE 16

| User Location | Tags location | Story location |
|---|---|---|
| /p1/s1 | /p1/s1,/p1/s1/t1 | /p1/s1 |
| /p1 | /p1 | /p1 |

In some embodiments, when a POST news API is called, the system can assign a location to the news story. In some embodiments, the location can be assigned based on user location and tags location. In some embodiments, in the event that a tag location changes, the news story will not change location. The news is currently immutable.

Some embodiments include reporting of a historian event when a news feed is generated. In some embodiments, once the reporter 1320 finds a news story, a message is sent to the service bus queue 1330. The message can be picked up by WWOnline Core 1340 and is stored in the event storage. The WWOnline Core 1340 has a service bus which is used by the system to send event into WWOnline Core Storage, where the service bus can be reused for the reporter. A service bus message 1310 can include properties and payload. The properties will contain at least a TenantId to identify for which tenant, and a version of the message, including ApplicationName, comprising the name of the application sending the message.

```
A sample payload can comprise: {
"ID",
"eventtime" (Anomaly happened),
"eventtype", (News.anomaly???)
"source_name",
"namespace",
"source_processvariable",
"provider_system", ( WWO.NewsFeed),
"reported_time",
"news_story_id", (string)
"news_algorithm",
"news_reporter"
}
```

The following Table 17 describes the different properties.

TABLE 17

| Property Name | Data Type | Description | Examples/Allowed Values |
|---|---|---|---|
| ID | GUID | | |
| eventtime | DateTimeOffset | | 2017-11-11T05:02:00.000Z |
| eventtype | String | | "News.anomaly" |
| source_name | String | Source of the tag | "Sys" from sys.tagname |
| namespace | String | Namespace of the tag | "News" |
| source_processvariable | String | Related tag | "sys.ODataRetrieval_IN_0.CPU" |
| provider_system | String | Software system that generated the event. | "WWO.NewsFeed" |
| reported_time | String | When the news was reported | 2017-11-11T05:02:00.000Z |
| news_story_id | String | The related news id | "25s5f7451f8" |
| news_algorithm | String | Which algorithm reported it | "xtch" |
| news_reporter | String | Which reporter reported it | "Atticus" |

In some embodiments, the reporter will send a message in the service bus. In some embodiments, there is no validation done from the reporter side to validate that the event is stored. In some embodiments, this is the responsibility of WWOnline Core 1340.

Some embodiments include reporters running on an analytics engine for short news cycles. In some embodiments, the reporters process new data as it comes into one or more Microsoft® Azure® storage L2 blobs. In some embodiments, the system can include "Ingest process(es) (on separate vm(s)) decode(s) packets from L0 to L1 (but not store forward or string packets) and zippers L1 blobs to L2 blobs", and all other tags are supplied data from L2 with models and recent roll-ups from blobs. Further, in some embodiments, the system processing can scale out to multiple processes and multiple virtual machines as needed, and new machines can be added manually.

Some embodiments include an analytics tile in the management console that can be used to develop, test and diagnose the newsfeed functionalities using snaplets. In some embodiments, the management console can interact with note book back-end machine which then writes all the data/code to the storage containers. A notebooks container in the storage account will house all the data in a specific order.

Some non-limiting notebook examples are shown in the following Table 18:

TABLE 18

```
snap
    correlated source sys days 2 samples 3 threshold 95 start-day
    2018-01-10
onto
    blob named sys.1
snap
    hcal source sys from jan to feb
onto
    mta_train systems sys.1
onto
    blob named mta.1 scope datasource
onto
    show
snap
    hcal source sys
onto
    sort by tag by timestamp
onto
    stream named L1
snap
    stream named L1
onto
    mta_monitor model mta.1
onto
    show
onto
    news
snap
    stream named L1
onto
    smartglance
onto
    show
snap
    hcal source all since mar
onto
    mta_monitor model mta.1
onto
    show
onto
    news
snap
    l2 source sys
onto
    fork named sta
snap
    fork named sta
onto
    xtca
onto
    news
snap
    fork named sta
onto
    xtlf
onto
    news
snap
    fork named sta
onto
    enta
```

TABLE 18-continued

```
onto
    news
snap
    ....
onto
    stream named my.stream
snap
    stream named my.stream
....
snap
    stream named my.stream
....
Snap
    tags source sys containing available
onto
    span since mar
onto
    deltas
onto
    maximum days 1
onto
    show
snap
    tags count 10
onto
    minutes count 8000
onto
    random distribution uniform from 55 to 65 fail 7000
onto
    random distribution normal mean 60 stddev 1
snap
    tags source sys
onto
    span since feb
onto
    deltas
onto
    entropy window 360 bins 100
onto
    golden consec 2 train 14 coef 0 chance 5
onto
    deltas
onto
    show
snap
    tags sources all
snap
    tags sources containing
snap
    hcal since
snap
    related source sys days 2 samples 3 start-day 2018-01-10
snap
    sources env prod
onto
    filter field volume gte 10
onto
    filter field source lacks wonder
onto
    filter field source lacks test
onto
    filter field source lacks ww
onto
    filter field source lacks demo
onto
    filter field solution lacks wonder
onto
    filter field solution lacks test
onto
    filter field solution lacks ww
onto
    filter field solution lacks demo
onto
    show
snap/onto
    blob/fork/stream scope notebook/user/solution named
    sys.mean.minutes.10
snap
    blobs matching sys.xyz.*
onto
```

TABLE 18-continued

```
    zipper
onto
    news
onto
    slack
onto
    smartglance
snap
    tags onto my.function
```

Some embodiments enable the system to monitor analytics system health. Some embodiments include a customizable health reporter. In some embodiments, a customizable health reporter can include a set of reporters (e.g., comprising snaplet codes) that are aimed to diagnose the current health of newsfeed and showcase the results in management console. The following description includes different snaplet codes and steps of how to run them. In some embodiments, using an open analytics tile on the management console, a user can copy each of the following codes into different cells of a notebook. The user can run each cell (e.g., by pressing "CTRL Enter") to obtain results of different queries that are aimed to showcase the current health of newsfeed. In some embodiments, the news story reporter codes can comprise "snap every 6 hours", "onto news since 24 hours ago", "onto count by solution and source.name and algorithm", "onto show title", and "news story counts by solution, data source and algorithm for last 24 hours".

In some embodiments, the expected output can comprise a tabulated result titled "news story counts by solution, data source and algorithm for last 24 hours" containing four columns viz. "solution", "source.name", "algorithm", and "count" followed by a list of rows for each news stories that has been generated within past 24 hours.

In some embodiments, the missing source-information reporter code can comprise "snap every 6 hours", "onto logs since two hours ago", "onto keep if text contains boot: and no and source-info and for", "onto count by text", "onto count", and "onto show title missing source-info bleep". In some embodiments, the expected output can comprise a single cell titled "missing source-info" containing a column "count" followed by a row containing a number that shows the total number of existing data source containers in which the "source-info" blob is missing.

A non-limiting embodiment of a running bee reporter can comprise "snap every 3 hours", "onto blobs container.name system prefix notebook/AAAAAAAA/suffix/progress", "onto keep if blob.text contains running", "onto select fields", "solution and", "source.name as source and", "blob.name dot folder concat code dot text word 2 as snaplet and", "blob.text dot version word 1 sep T as version and", "blob.text dot vm word 2 sep m as vm and", "blob.text dot bee as bee and", "blob.text dot waittime in smhd as wait and", "blob.text dot started in age in smhd as time", "onto show title list of running bees bleep".

In some embodiments, the expected output can comprise a tabulated result titled "list of running bees" containing eight columns viz. "solution", "source", "snaplet", "version", "vm", "bee", "wait", and "time (age)" followed by a list of rows for each process that is currently running.

Some embodiments include a tiny logs reporter comprising "snap every 6 hours", "snap blobs container.name log.container prefix logs/", "onto keep if blob.size lte 200", "onto count as tiny.logs", and "onto show".

In some embodiments, the expected output can comprise a single cell with a column "tiny.logs" followed by a row containing a number to show the total number of logs sizing less than or equal to 200 bytes. Some embodiments include duplicate story reporter comprising "snap every 6 hours", "onto news since 72 hours ago", "onto count by solution and source.name and algorithm and function", "onto keep if count gte 2", and "onto show title duplicate stories bleep". In some embodiments, the expected output comprises a tabulated result titled 'duplicate stories' containing four columns viz. "solution", "source.name", "algorithm", and "fqn" followed by a list of rows for each duplicate story that is generated within past 72 hours.

Some embodiments include an error count reporter comprising a "snap every 6 hours", "onto logs since 24 hours ago", "onto keep if level is error", "onto count by text as error", and "onto show title error counts over last 24 hours bleep". In some embodiments, the expected output can comprise a single cell titled 'error counts over last 24 hours' with a column "error" followed by a row containing a number to show the total number of errors generated within past 24 hours.

Some embodiments include backlogs for data source reporter comprising the following in Table 19:

TABLE 19

```
snap every 6 hours
onto sources
onto keep if volume in megs gte 10
onto fork named sources
snap fork named sources
onto toss if decode.lag in minutes lte 40
onto select fields
    source.id and
    storage and
    solution and
    source.name and
    decode.lag in smhd
onto show
snap fork named sources
onto toss if zipper.lag in minutes lte 40
onto select fields
    storage and
    solution and
    source.name and
    zipper.lag in smhd
onto show
snap fork named sources
onto toss if news.lag in minutes lte 40
onto select fields
    storage and
    solution and
    source.name and
    source.id and
    news.lag in smhd
onto show
snap fork named sources
onto toss if slicer.lag in hours lte 72
onto select fields
    storage and
    solution and
    source.name and
    slicer.lag in smhd
onto show
snap fork named sources
onto select fields
    storage and
    solution and
    source.name as source and
    tag.count and
    volume in megs and
    decode.backlog in megs as decode and
    zipper.backlog in megs as zipper and
    slicer.backlog in megs as slicer and
    news.backlog in megs as news
onto show title backlogs for data sources with at least 10 meg volume
bleep
```

In some embodiment, the expected output can comprise "individual cells" for "decode.lag", "zipper.lag", "news.lag", and "slicer.lag" that show up with the amount of time lag if the time taking for a bee running these snaplets (decode, zipper, etc.) takes more than twice its schedule time of running autonomously.

Some embodiments include a tabulated result titled "backlogs for data sources with at least 10 meg volume" containing nine columns viz. "storage", "solution", "source", "tag.count", "volume (megs)", "decode (megs)", "zipper (megs)", "slicer (megs)", "news (megs)" followed by a list of rows for each data source with volume greater than or equal to 10 megs.

Some embodiments include a cell wait time/code runtime reporter comprising as shown in Table 20:

TABLE 20 snap every 6 hours
onto logs since one hour ago
onto fork named logs
snap fork named logs
onto keep if text contains number and cells and waiting
onto keep first 1
onto select field text word 9 as cells.waiting
onto show title number of cells waiting for a bee
snap fork named logs
onto keep if text contains cell and completed
onto sum field
   text word 5 in seconds as total.runtime
   by code word 2
onto show title total runtimes in last hour for decode, slicer, et. al. bleep Some embodiments include two tables as follows: A single cell titled "number of cells waiting for a bee" with a column "cells.waiting" followed by a number to show the total numbers of cells currently in queue waiting to be picked up by a bee. A tabulated result titled "total runtimes in last hour for decode, slicer, et. al." containing two columns viz. "code", and "total.runtime (seconds)" followed by a list of codes i.e. decode, slicer, et. al. that ran in past 1 hour.

Some embodiments include an orphan containers reporter comprising "snap every 6 hours", "onto sources list orphans", "onto select fields", "storage and source.id as orphaned.containers", and "onto show title list of orphaned containers bleep".

In some embodiments, the expected output can comprise a table titled "list of orphaned containers" with two columns "storage" and "orphaned.container" followed by list of rows containing the storage account name and GUID of datasource container that has a storage container while it is not found in Cosmos DB database.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the description, figures, and claims herein.

The invention claimed is:

1. A server system comprising:
   at least one processor configured to be coupled to a non-transitory computer-readable storage medium, the non-transitory computer-readable storage medium tangibly storing thereon program logic for execution by the at least one processor, the program logic comprising:
     instructions executable by the at least one processor for managing an exchange of at least one data stream between at least one management console and at least one distributed component of a distributed environment, the at least one management console comprising:
     a customizable interface for integrating an extensible set of software modules providing data links to one or more of the distributed components, the software modules comprising one or more user-definable composition blocks configured to submit requests or control one or more of the distributed components, wherein the one or more user-definable composition blocks submitted into the management console enables operational access to exposed attributes corresponding to an operational status of at least one of the distributed components, wherein the one or more user-definable composition blocks comprise executable code that enables a fork variation of an analysis; and instructions executable by the at least one processor for displaying one or more data view windows, wherein at least one of the data view windows includes data and/or controls for manipulating graphically displayed representations of data extracted from the at least one data stream.

2. The server system of claim 1, wherein the one or more distributed components include one or more distributed components of a process control and/or manufacturing information system.

3. The server system of claim 2, wherein the one or more data view windows includes at least one work area populated by attributes or data obtained from execution of at least one of the user-definable composition blocks.

4. The server system of claim 1, wherein the at least one data stream comprises at least one of diagnostic data, operation or control code of one or more coupled servers and/or application engines, operational status of at least one database, and an operational status of at least one coupled distributed component.

5. The server system of claim 1, wherein the software modules are configured to provide at least one user with bi-directional access to logic objects configurable for issuing commands to application objects within the distributed environment.

6. The server system of claim 1, wherein the set of software modules comprise one or more snaplet modules that provide data and/or interface control definitions.

7. The server system of claim 1, wherein the one or more user-definable composition blocks comprise a scalable code architecture.

8. The server system of claim 1, wherein the one or more user-definable composition blocks comprise a forked-code architecture.

9. The server system of claim 1, wherein the one or more user-definable composition blocks comprise a code architecture with a capability to perform at least one operation comprising at least one of run against real data, run against streaming incoming data, and create derived streams of data.

10. The server system of claim 1, wherein the user-definable composition blocks comprise a snap language defining executable code configurable by at least one user to dynamically add one or more data processing units.

11. The server system of claim 10, wherein the one or more data processing units are configured to be identified and executed by at least one worker process of the distributed environment.

12. The server system of claim 11, wherein the at least one worker process comprises a scheduler configured to select at least one of the data processing units for processing at a specific time or schedule.

13. The server system of claim 11, wherein the one or more data processing units can be added on the fly for selection and processing by the at least one worker process.

14. The server system of claim 10, wherein the one or more data processing units are configured to create a model for multi-tag anomaly analysis.

15. The server system of claim 1, further comprising an application program interface configured to generate a comments display associated with at least one of the data view windows.

16. A server system comprising;
at least one processor configured to be coupled to a non-transitory computer-readable storage medium, the non-transitory computer-readable storage medium tangibly storing thereon program logic for execution by the at least one processor, the program logic comprising:
at least one user-definable composition block comprising a snap language defining executable code configurable by at least one user, wherein at least a portion of the executable code is configured to create and launch one or more data processing units dynamically within a distributed environment, wherein the at least one user-definable composition block comprises a code architecture configured to run a plurality of analyses simultaneously;
instructions executable by the at least one processor for managing display and control of a management console, the management console configured to accept the at least one user-definable composition block, and further configured to manage the exchange of at least one data stream between the at least one management console and at least one distributed component of the distributed environment; and
wherein the one or more data processing units are configured to be identified and executed by at least one worker process running on at least one processor of the distributed environment.

17. The server system of claim 16, wherein the at least one management console comprises a customizable interface configured and arranged for integrating an extensible set of software modules providing data links to one or more of the distributed components of the distributed environment.

18. The server system of claim 17, wherein the set of software modules comprise one or more user-definable composition blocks configured to submit requests or control one or more of the distributed components, and/or enable operational access to exposed attributes corresponding to an operational status of at least one of the distributed components.

19. The server system of claim 16, further comprising at least one module executable by the at least one processor for displaying one or more data view windows, wherein at least one of the data view windows includes data and/or controls for manipulating graphically displayed representations of data extracted from the at least one data stream.

20. The server system of claim 19, further comprising an application program interface configured to generate a comments display associated with at least one of the data view windows.

* * * * *